(12) United States Patent
Noonburg

(10) Patent No.: US 7,471,298 B1
(45) Date of Patent: Dec. 30, 2008

(54) FETCHING PIXEL DATA WITH REDUCED MEMORY BANDWIDTH REQUIREMENT

(75) Inventor: Derek B. Noonburg, San Jose, CA (US)

(73) Assignee: S3 Graphics Co., Ltd., Grand Cayman, British West Indies ( * ) Notice: Subject to any disclaimer, the term of this patent is extended or adjusted under 35 U.S.C. 154(b) by 1222 days.

(21) Appl. No.: 09/901,936

(22) Filed: Jul. 9, 2001

Related U.S. Application Data

(63) Continuation-in-part of application No. 09/604,550, filed on Jun. 26, 2000, now Pat. No. 6,614,442.

(51) Int. Cl.
G09G 5/39 (2006.01)
G06F 12/02 (2006.01)
H04B 1/66 (2006.01)

(52) U.S. Cl. .................. 345/531; 345/544; 375/240.16

(58) Field of Classification Search ................ 345/530, 345/531, 533, 544, 501, 572, 555; 375/240, 375/240.01, 240.12, 240.16, 240.23; 348/407.1
See application file for complete search history.

(56) References Cited

U.S. PATENT DOCUMENTS

| | | | | |
|---|---|---|---|---|
| 5,170,251 A | * | 12/1992 | Levy | .................. 348/446 |
| 5,390,299 A | * | 2/1995 | Rege et al. | .................. 709/234 |
| 5,579,052 A | * | 11/1996 | Artieri | .................. 375/240.15 |
| 5,990,958 A | * | 11/1999 | Bheda et al. | .................. 348/407.1 |
| 6,014,416 A | | 1/2000 | Shin et al. | |
| 6,104,416 A | * | 8/2000 | McGuinness | .................. 345/544 |
| 6,292,194 B1 | | 9/2001 | Powell, III | |
| 6,525,783 B1 | * | 2/2003 | Kim et al. | .................. 348/714 |
| 6,614,442 B1 | | 9/2003 | Ouyang et al. | |
| 6,631,164 B1 | * | 10/2003 | Sorin et al. | .................. 375/240.26 |

OTHER PUBLICATIONS

"Lookup table." http://en.wikipedia.org/wiki/Lookup_table.*
ISO/IEC, Information Technology-Generic Coding of Moving Pictures and Associated Audio Information:Video, ISO International Standards 13818-2, 12-15-200, Second Edition, Switzerland.

* cited by examiner

Primary Examiner—Kee M Tung
Assistant Examiner—Joni Hsu
(74) Attorney, Agent, or Firm—Thomas, Kayden, Horstemeyer & Risley

(57) ABSTRACT

A system and method is provided which enables pixel data stored in multiple memory pages to be combined in one data packet, thereby reducing the number of data packets needed to transfer a group of reference pixel data. In one embodiment for reducing the reference data fetch bandwidth, the method as applied to a real-time video decoding system optimally combines pixel data stored in different memory pages, and fits the pixel data into a predetermined number of data packets.

41 Claims, 16 Drawing Sheets

FETCHING PIXEL DATA WITH REDUCED MEMORY BANDWIDTH REQUIREMENT

CROSS-REFERENCES TO RELATED APPLICATIONS

This application claims the benefit and is a continuation-in-part of commonly assigned U.S. patent application Ser. No. 09/604,550, entitled "Macroblock Tiling Format for Motion Compensation" filed on Jun. 26, 2000 now U.S. Pat. No. 6,614,442. The subject matter of the related application is hereby incorporation by reference.

BACKGROUND OF THE INVENTION

1. Field of the Invention

The invention relates generally to digital video processing, and particularly to fetching reference pixel data during reconstruction of a compressed video bit stream.

2. Description of Related Art

Typically, non-compressed video and audio data are too large for storage and network communications. Modern video compression methods utilize several techniques to achieve compression ratios of hundreds to one. MPEG (Moving Picture Experts Group), a committee working under the joint direction of the International Standards Organization (ISO) and the International Electro-Technical Commission (IEC), has developed multiple standards for encoding video and accompanying audio data. Over the years, MPEG standards have progressed through several levels with increasing sophistication and quality.

Video compression relies upon a human eye's inability to resolve high frequency color changes and the large amount of redundancy within and between pictures in a video. MPEG achieves high compression rates by compressing the pictures in a time dimension, and encoding only changes from one picture to another instead of each entire picture of a series of pictures in a video. These techniques for using past and/or future pictures to compensate for part of a current picture in a compressed video is called motion compensation.

For purposes of motion compensation, MPEG, typically, defines three main types of pictures: intra-coded, predictive-coded and bi-directional predictive coded. Intra-coded pictures (I-picture) are coded without reference to other pictures and with only moderate compression. A predictive-coded picture (P-picture) is coded more efficiently using motion compensated prediction from a past intra- or predictive-coded picture, and is generally used as a reference for further prediction. Finally, a bi-directionally predictive coded picture (B-picture) provides the highest degree of compression, but requires use of both past and future reference pictures for motion compensation.

Typically, a compressed MPEG video includes groups of I-pictures, B-pictures and P-pictures. Each group of I-pictures, B-pictures and F-pictures is known as a group of pictures (GOP). FIG. 1 is an exemplary illustration of a GOP having an I-picture 102, two P-pictures 104 and 106, and five B-pictures 108, 110, 112, 114 and 116, and is illustrative of a conventional relationship among the three different picture types. The I-picture 102 includes full picture information, and has relatively the least amount of compression. The P-picture 104 is predicted from the I-picture 102, while the P-picture 106 is predicted from the P-picture 104. Subsequently, the B-picture 108 uses the past I-picture 102 and the future P-picture 104 as references, and the B-picture 112 uses the past P-picture 104 and the future P-picture 106 as references.

When a picture, such as the I-picture 102, is coded, the picture is first divided into a plurality of non-overlapping macroblocks. Typically, each of the macroblocks corresponds to a 16×16 pixel area in the picture. If the picture is represented by three color planes (i.e., a red plane, a green plane and a blue plane), RGB data in each macroblock is converted into a set of Y, Cr and Cb data. The Y or luminance data quantifies the overall brightness of the pixels in the macroblock, and is derived by totaling together all three of the RGB data. The Cr and Cb data are color difference data.

Conventionally, there are three chrominance formats for a macroblock, namely 4:2:0, 4:2:2 and 4:4:4. When the 4:2:0 format is used, a macroblock includes four 8×8 Y blocks, one 8×8 Cr block and one 8×8 Cb block. For each 8×8 block, the Discrete Cosine Transform (DCT) is used, along with other encoding procedures including quantization and variable length coding (VLC). A macroblock thus coded is called an intra-coded macroblock.

A P-picture, such as P-picture 104, is encoded by reusing part of the data contained in the previous I-picture 102. Each macroblock in the uncompressed P-picture 104, called a "target block", is compared to areas of similar size from the uncompressed I-picture 102 in order to find an area or a "matching block" that is similar. Sometimes, the matching block happens to be in the same location in the past frame as the target block is in the current frame, and there is no difference (or the difference is negligible) between the target block and the matching block. In this situation, the target block may not be coded at all and is labeled a "skipped macroblock". More often, the matching block is in a different location and/or there is some difference between the target block and the matching block. In this situation, only the difference between the target block and the matching block is encoded. Further, a motion vector, which indicates the relative difference in location between the target block and the matching block, is constructed and encoded in place of the data shared by the target block and the matching block. Because many fewer bits are required to code the motion vector than to code the video data shared by the target block and the matching block, compression is achieved.

A B-picture is coded by reusing data from both a past picture and a future picture. Thus, a macroblock of a B-picture may use matching macroblocks from both a past and future reference picture. Because information not found in the past picture may be found in the future picture, bi-directional motion compensation is much more effective than compression that uses only a single past picture. Further, bi-directional motion compensation allows more macroblocks to be replaced by motion vectors. A macroblock coded by referencing data in past and/or future pictures is called a "non-intra-coded" or "inter-coded" macroblock.

However, if no matching block for a macroblock in an uncompressed P-picture or B-picture can be found in the reference pictures, the macroblock cannot be motion compensated and will be coded as an intra-coded macroblock.

An MPEG compressed video bit stream (VBS) must be decoded before display. The I-pictures in the VBS can be decoded without reference to any other pictures in the VBS. However, a B-picture or P-picture in the VBS can only be reconstructed by using data from relevant parts of past and/or future pictures. Because a B-coded macroblock may contain motion vectors pointing to matching blocks in both a past I-picture or P-picture and a future I-picture or P-picture, these past and future I-pictures or P-pictures have to be decoded and stored before the B-coded macroblock is decoded. This decoding process, typically, results in transmission of pictures in a video bit stream in a different order from which the pictures will be displayed.

A conventional MPEG compliant decoder will write decoded pictures into a buffer memory, so that pixel data in reference pictures may be available to the MPEG decoder for motion compensation. For example, when a P-coded 16×16 macroblock is being decoded, one matching block in a previous I-picture or P-picture, as referenced by the motion vector associated with the P-coded macroblock, may be fetched from the buffer memory and be used to reconstruct the P-coded macroblock.

In a typical, real-time video decoding system, the buffer memory and associated memory bus are shared by several peripherals (e.g., MPEG video or audio decoder, audio input and video input, etc.). All of these peripherals have real-time constraints (i.e., each of the peripherals requires a certain minimum amount of memory bandwidth to work correctly). If the required bandwidth is not available, a failure may occur, such as a missed video frame or an audio "pop".

In order to reduce overhead associated with the transfer of data to and/or from the buffer memory and to make more efficient use of the memory bus, video and audio data are, conventionally, transferred between the buffer memory and the peripherals in data packets. One way to guarantee bandwidth to a collection of peripherals is to use time-domain multiplexing in order to time-slice the memory bus. When time-domain multiplexing is used, each peripheral is allowed to transfer a fixed amount of data packets to and/or from the buffer memory during a certain time period. The amount of data in a data packet is usually fixed, and there is a requirement that each of the data packets from the buffer memory may only include data from a single memory page in the buffer memory.

Reference pixel data corresponding to a matching block may come from random places in a picture and may fall across multiple memory pages. Within each memory page, the required reference pixel data usually do not fill an integral number of data packets. For example, if each data packet holds 16 bytes of data and there are 18 bytes of required pixel data within one memory page, two packets that are capable of holding 32 bytes of data are used to carry the 18 bytes of required pixel data from this memory page. This inefficient use of data packets places more requirements on memory bandwidth.

Therefore, there is a need for an apparatus and method for improving memory bandwidth efficiency during a real-time video decoding process.

SUMMARY OF THE INVENTION

The present invention advantageously provides a system and method that allows data from multiple memory pages to be combined into one data packet. Furthermore, the present invention optimally combines pixel data from different memory pages into data packets to reduce reference data fetch bandwidth requirements for a real-time video decoding system.

In one embodiment of the present invention, pixel data of decoded pictures are written into a memory and are mapped into specific memory locations using a macroblock tiling format memory address mapping method. By mapping the pixel data into specific memory locations, the number of memory pages across which a reference pixel chunk may fall is reduced. Subsequently, a new set of logic is added in an address generator and reference data assembly module associated with an MPEG coprocessor and in a memory interface unit associated with the memory in order to allow data packets from the memory to include data from more than one of the memory pages.

DESCRIPTION OF THE PREFERRED EMBODIMENT

The following detailed description is based upon the ISO/IEC International Standard 13818-2, and includes numerous specific details about encoded video bit streams and decoding methods to provide a thorough understanding of the present invention. However, it should be understood by those skilled in the art the present invention may be practiced outside of the ISO/IEC standard and without these specific details. In other instances, methods, procedures and components well known to those skilled in the art have not been described in detail so as not to obscure aspects of the present invention.

Figure 1:
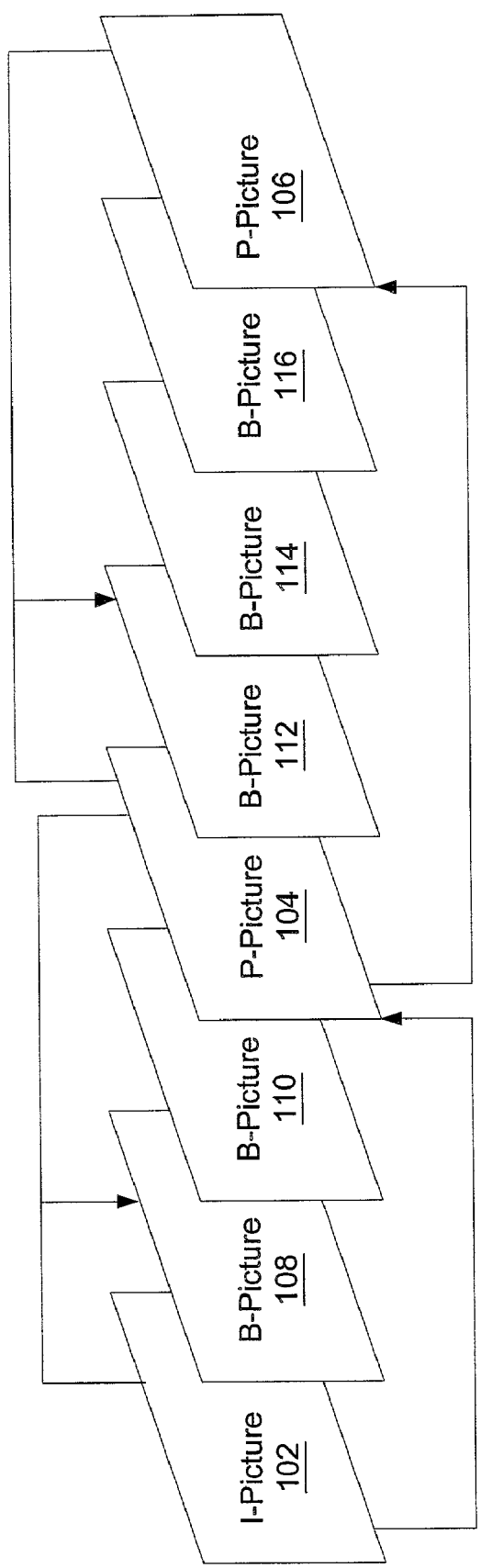
FIG. 1 is a diagram of an exemplary group of intra-coded, predictive-coded and bi-directional predictive coded picture frames.
Figure 2:
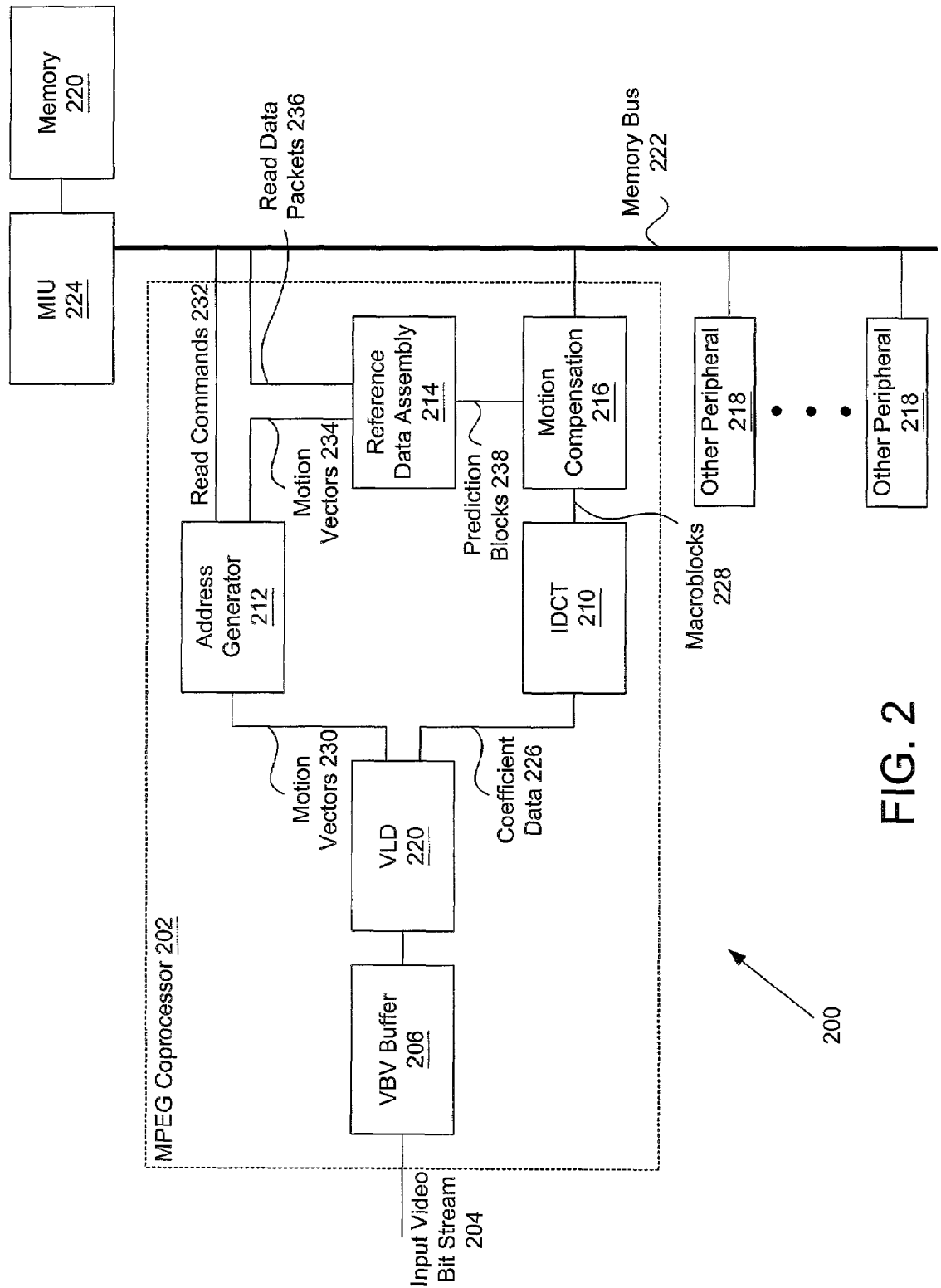
FIG. 2 is a block diagram of an overview of an MPEG video decoding system, according to the present invention.

Referring now to FIG. 2, a block diagram of a decoding system 200 is illustrated according to an exemplary embodiment of the present invention. The decoding system 200 includes an MPEG coprocessor 202 for decoding pictures in a compressed video bit stream 204. The MPEG coprocessor 202 includes a video buffering verifier (VBV) buffer 206, a variable length decoding (VLD) module 208, an inverse discrete cosine transformation (IDCT) module 210, an address generator 212, a reference data assembly module 214 and a motion compensation (MC) module 216. The decoding system 200 also includes other peripherals 218, such as a video input port, an MPEG audio decoder and an audio input port. The MPEG coprocessor 202 and the other peripherals 218 make use of a memory 220, and communicate with the memory 220 through a memory bus 222 and a memory interface unit (MIU) 224. The memory 220 has memory spaces that can be configured to store multiple decoded pictures.

Figure 3:
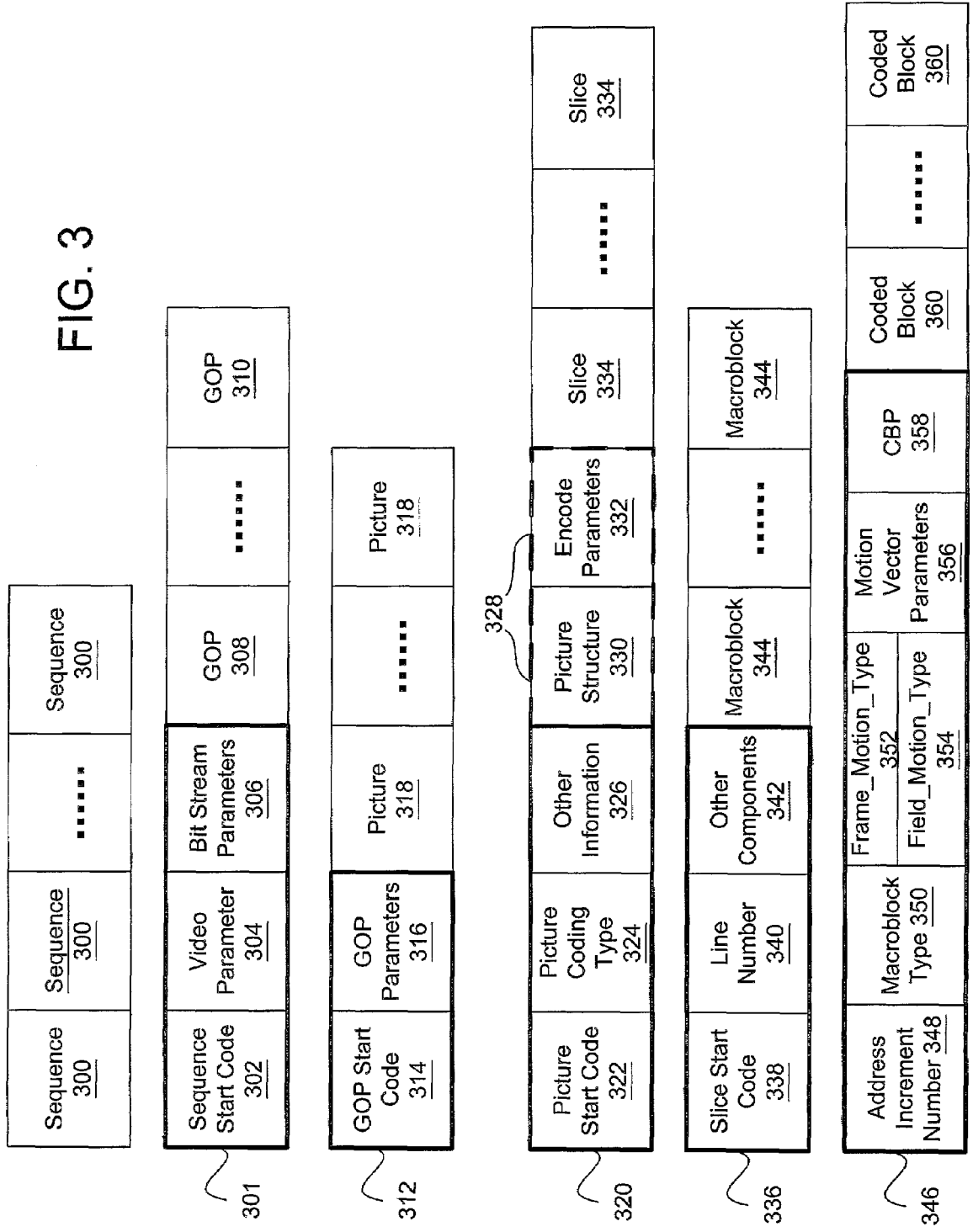
FIG. 3 is a block diagram of a structure of an MPEG compressed video bit stream, according to the present invention.

In accordance with one embodiment of the present invention, the input video bit stream 204 is compressed from an original video using a set of procedures including discrete cosine transform, quanitzation, variable length coding and motion compensation. In general, the video bit stream 204 can be thought of as a syntactic hierarchy in which syntactic structures contain one or more subordinate structures. For example, FIG. 3 shows the video bit stream 204 having a series of video sequences 300, which are the highest syntactic structure of the video bit stream 204. Each video sequence 300 begins with a sequence header 301 including information such as a sequence start code 302 for delineating a boundary between two consecutive sequences, a set of video parameters 304 such as width, height, aspect ration of pixels and pictures, and a set of bitstream parameters 306 such as bit rate, buffer size and a constrained parameters flag. A sequence 300 also includes a series of picture structures (GOPs 308 and 310). Each GOP 308 or 310 may start with a GOP header 312 including a GOP start code 314 for delineating a boundary between two consecutive GOPs, and a set of GOP parameters 316 including bits describing the structure of the GOP 308 or 310.

The GOP header 312 is followed by picture structures 318. Each picture structure 318 begins with a picture header 320 which incorporates coded information including a picture start code 322 for delineating a boundary between two consecutive picture structures, a picture coding type 324, which indicates whether the picture is an I-picture, P-picture or B-picture and other information 326 related to the coded pictures. The picture header 320 is followed by a picture coding extension 328 having coded information of a picture structure 330 indicating whether the picture is a frame picture of a top or bottom field picture. The picture coding extension 328 further includes a set of encode parameters 332 for indicating whether half pixel motion vectors should be utilized.

The picture coding extension 328 of a picture structure 318 is followed by a series of slice structures 334. A slice is a series of an arbitrary number of adjacent macroblocks from a single row of macroblocks. Each slice structure 334 starts with a slice header 336 including a slice start code (SSC) 338, a line number 340 indicating the line on which the slice starts and other components 342 of the slice structure 334.

Figures 4A, 4B:
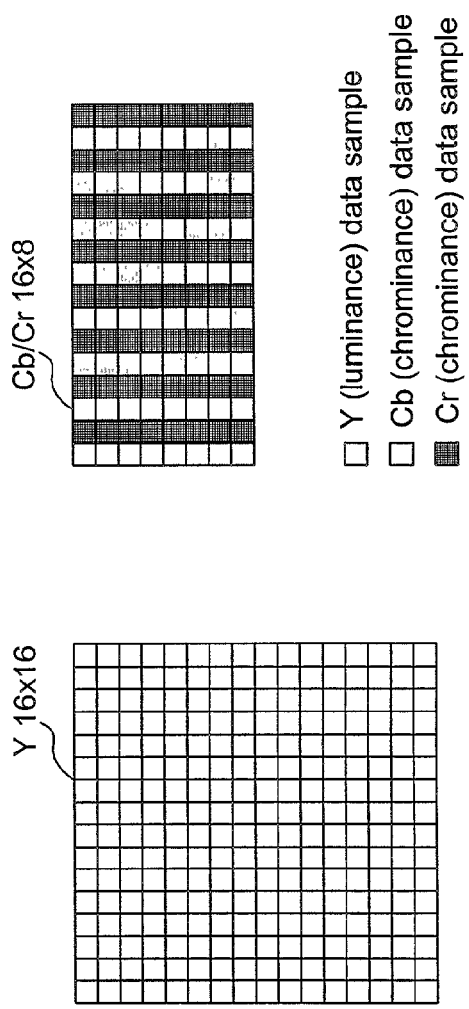
FIG. 4A is a diagram illustrating a 4:2:0 chrominance format.
FIG. 4B is a diagram illustrating that each macroblock corresponds to a 16×16 block of luminance data samples and a 16×8 block of interleaved chrominance data samples.

The slice header 336 of a slice structure 334 is followed by a series of macroblock structures 344. The term macroblock can either refer to source and decoded data or to corresponding coded data elements. There are three chrominance standard formats for a macroblock: 4:2:0, 4:2:2 and 4:4:4 formats. Although it is recognized that the present invention is not limited by any chrominance formats, the 4:2:0 format, as used by HDTV, is used here as an example to aid the description of an exemplary embodiment. A 4:2:0 macroblock includes six (6) 8×8 blocks, which are four (4) Y or 8×8 luminance blocks 400a-400d, one (1) Cb chrominance 8×8 block 402 and one (1) Cr chrominance 8×8 block 404 as shown in FIG. 4A. In a macroblock, the four Y blocks 400a-400d together represent a section of the luminance component of a picture and the Cb and Cr blocks 402 and 404, respectively, are spatially corresponding chrominance components of the picture.

A coded picture in a compressed video bit stream can be a field picture of a frame picture. Further, each macroblock within a coded picture can be intra-coded or inter-coded. Intra-coded macroblocks do not need to be reconstructed with motion compensation. Alternatively, an inter-coded macroblock in a frame picture may be in one of three prediction modes: frame, field or dual prime, while an inter-coded macroblock in a field picture may be in one of three prediction modes: field, 16×8 or dual prime. These prediction modes are described in more detail in the specification of the ISO/IEC International Standard 13818-2.

Referring back to FIG. 3, the macroblock structure 344 in the video bit stream 204 (FIG. 2) includes a macroblock (MB) header 346 having information such as an address increment number 348 indicating the number of skipped macroblocks prior to the present macroblock, a "macroblock type" 350 which is a variable length coded indicator that indicates the method of coding and content of the macroblock, and a "frame_motion_type" 352 and a "field_motion_type" 354 indicating a type of the macroblock motion prediction, and a set of motion vector parameters 356 including a number of associated motion vectors and a motion vector format. The MB header 346 may also include a "motion_vertical_field_select [r][s]" which is a flag for indicating which reference field picture shall be used to form the prediction when the macroblock is decoded, a "motion_code[r][s][t]" and a "motion_residual [r][s][t]" which are variable length codes used in motion vector decoding (not shown). The MB header 346 further includes a coded block pattern (CBP) 358. If the macroblock is inter-coded, the CBP 358 is a bitmap indicating which of the Y, Cr and Cb blocks corresponding to the macroblock are coded. Following the MB header 346 are corresponding coded blocks 360 associated with the $Y_0$, $Y_1$, $Y_2$, $Y_3$, Cb and/or Cr blocks as shown in FIG. 4A. A description of the details of the structure and syntax of the video bit stream 204 can be found, for example, in the ISO/IEC International Standard 13818-2.

Returning to FIG. 2, the information in the headers and extensions of the input video bit stream 204 are used to control the decoding process in all of the modules of the decoding system 200. The VBV buffer 206 is a hypothetical decoder that is conceptually coupled to the output of an encoder so as to constrain variability of data rate that the encoder or editing process may generate. The function of the variable length decoding VLD module 208 is to decode the variable length coded data in the video bit stream 204. Although not explicitly shown as part of the decoding process, an inverse scan function can be performed to specify the way in which one-dimensional data are converted into a two-dimensional array of coefficients. Furthermore, the two dimensional array of coefficients can be inversely quantized to produce the reconstructed DCT coefficients. The IDCT ($dct^{-1}$) module 210 functions to reverse the discrete cosine transform performed on the Y, Cb and Cr blocks of the original video, by taking part of the output of the VLD module 208 (i.e., coefficient data 226), and transforming the output back into (macroblock) pixel data 228. For each non-skipped macroblock, the pixel data 228 are in the form of data matrices corresponding to some or all of the six (6) Y, Cb and Cr blocks of the macroblock. These pixel data are transferred to the MC module 216.

In one exemplary embodiment, for each inter-coded macroblock in the video bit stream 204, the VLD module 208 also performs the function of extracting the motion vectors, the macroblock type, the motion prediction mode, the macroblock coordinates, and other flags corresponding to the macroblock from the headers and extensions of the input video bit stream 204, and sends motion vector data 230 to the address generator 212. The address generator 212 uses the motion vector data 230 to generate memory addresses at which pixel data corresponding to one or two matching blocks of the inter-coded macroblock are stored. Afterwards, the address generator 212 posts read commands 232 including the memory addresses onto the memory bus 222. The address generator 212 also sends motion vector information 234, the macroblock type, the motion prediction mode, the macroblock coordinates, and other flags corresponding to the macroblock to the reference data assembly module 214.

The memory interface unit 224 receives the read commands 232, assembles read packets including pixel data associated with the matching block(s) and sends read packets 236 to the reference data assembly module 214. The reference data assembly module 214 unpacks the read packets 236 and arranges the data in the read packets 236 into prediction blocks 238 based on the information of the motion vectors, the macroblocks type, the motion prediction mode, the macroblock coordinates, and other flags corresponding to the macroblock. The prediction blocks 238 are in a form ready to be combined with the pixel data 228 from the IDCT module 210, This combining process is performed in the MC module 216. The MC module 216 also performs the function of forming write commands and write packets for writing a reconstructed macroblock into the memory 220.

While an intra-coded macroblock does not need to be reconstructed with motion compensation, the intra-coded macroblock is processed by the MC module 216, which writes the macroblock into specific addresses in the memory 220. When all of the macroblocks of a picture are reconstructed, the picture is considered decoded. A decoded I-picture or P-picture will stay in the memory 220 as a reference picture until all of the pictures depending on the I-picture or P-picture for motion compensation are reconstructed.

A decoded picture comes in two forms: frame and field. Typically, the frame is represented by three rectangular matrices of integers: a luminance matrix (Y) and two chrominance matrices (i.e., Cb and Cr). Alternatively, the field is associated with every other line of samples in the three rectangular matrices of integers representing the frame. The frame is a union of a top field and a bottom field. The top field is associated with a top-most line of each of the three matrices. The bottom field is associated with other lines of each of the three matrices. The two fields of a frame may be encoded separately and appear in a compressed video bit stream as two separate coded field pictures. If field pictures are used in a compressed video bit stream, the field pictures, typically, occur in pairs (one top field and one bottom field), and together constitute a coded frame. Both frame pictures and field pictures may be used in a single video sequence. In one embodiment of the present invention, reconstructed field pictures of a same frame are combined and stored as one frame in the memory 220, although these field pictures in the output of the decoding system 200 may be separated in time by a field period.

In an exemplary embodiment, an address mapping method called macroblock tiling format as disclosed in the co-pending patent Ser. No. 09/604,550 is used to map the Y matrix and the Cb/Cr matrices of a decoded frame into corresponding address spaces of the memory 220. The macroblock tiling format divides the Y matrix and the Cb/Cr matrices into a number of tiles, each tile including Y, Cr and/or Cb data samples corresponding to an integral number of macroblocks. Further, the data samples included in each tile can be stored in a single memory page of the memory 220.

In an embodiment where the 4:2:0 format is used, the luminance matrix of a decoded frame is stored separately from the chrominance matrices of the frame. The columns of the chrominance matrices of the frame are interleaved so that each macroblock corresponds to a 16×16 block of luminance data samples and a 16×8 block of interleaved chrominance data samples as shown in FIG. 4B. Typically, each luminance or chrominance data sample takes one byte of memory space. The luminance data samples corresponding to each macroblock of the frame is stored entirely within a single memory page, and the chrominance data samples corresponding to each macroblock of the frame is stored entirely within a single memory page. In one embodiment, the memory 220 is a dynamic random access memory (DRAM) having 1-kilobyte pages, while the memory bus 222 is 8-bytes (64-bits) wide.

Figure 5:
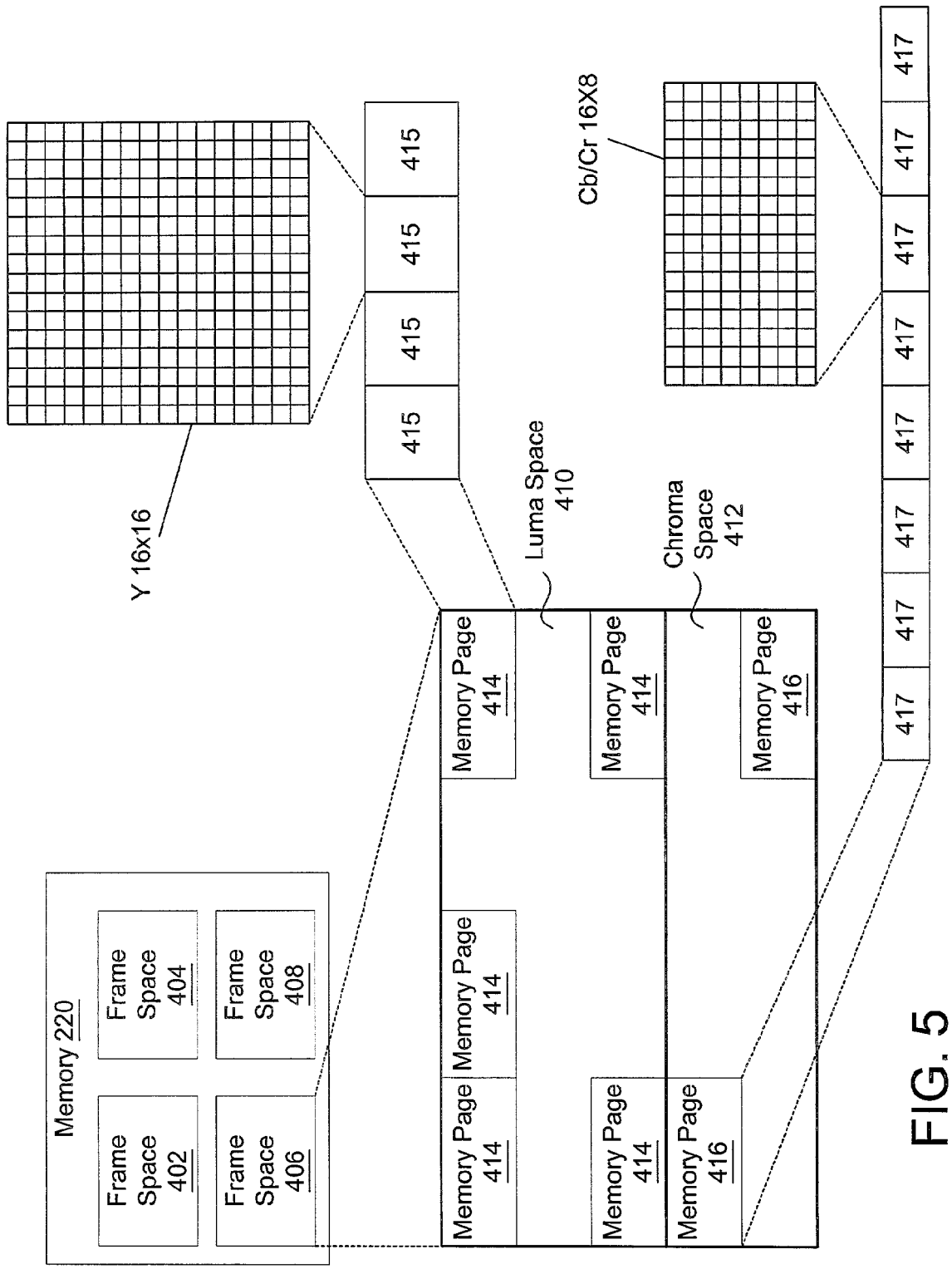
FIG. 5 is a diagram illustrating a macroblock tiling format used to store decoded picture frames.

As shown in FIG. 5, multiple frame spaces 402, 404, 406 and 408 may be allocated in the memory 220 where each frame space 402, 404, 406 and 408 stores one picture frame. Each frame space, such as frame space 406 is separated into a luminance (luma) space 410 for storing the luminance portion of a frame and a chrominance (chroma) space 412 for storing the chrominance portion of the frame. The luminance space 410 includes a plurality of 1K memory pages 414, each of these memory pages 414 storing luminance data samples corresponding to up to four horizontally adjacent macroblocks 415. The chrominance space 412 also includes a plurality of 1K memory pages 416, each storing interleaved chrominance data samples corresponding to up to eight horizontally adjacent macroblocks 417. The memory 220 is organized in 8-byte words (since the memory bus 222 (FIG. 2) is 8 bytes or 64-bits wide). How the luminance or chrominance data samples in each macroblock are mapped to the 8-byte words in the corresponding memory page 414 or 416 in the memory 220 can be flexible as long as it is consistent with all macroblocks processed by the MPEG coprocessor 202 (FIG. 2).

Motion compensation requires fetching pixels from one or two reference pictures. Depending on the motion prediction mode, the required reference pixels may be in 16×16 or 16×8 pixel chunks. A 16×16 pixel chunk includes a 16×16 block of luminance data samples and a 16×8 block of interleaved chrominance data samples, while a 16×8 pixel chunk includes a 16×8 block of luminance data samples and a 16×4 block of interleaved chrominance data samples. Because of horizontal and vertical half-pixel averaging, one extra row and/or one extra column of luminance and chrominance data samples are typically fetched. Therefore, the required reference pixels may be in 17×17 or 17×9 pixel chunks. A 17×17 pixel chunk includes a 17×17 block of luminance data samples and a 18×9 block of interleaved chrominance data samples, while a 17×9 pixel chunk includes a 17×9 block of luminance data samples and a 18×5 block of interleaved chrominance data samples.

Since the memory 220 is organized in 8-byte words, fetching a row of 17 or 18 samples requires reading three 8-byte words (or 24 bytes) from the memory 220. Therefore, fetching a 17×17 pixel chunk requires reading a luminance chunk consisting of 17 rows of three 8-byte words of luminance data samples and a chrominance chunk consisting of 9 rows of three 8-byte words of interleaved chrominance data samples.

Alternatively, fetching a 17×9 pixel chunk requires reading a luminance chunk consisting of 9 rows of three 8-byte words or luminance data samples and a chrominance chunk consisting of 5 rows of three 8-byte words of interleaved chrominance data samples.

If the decoding system is in real-time, a picture (either a frame or a field) needs to be decoded in one picture time. The picture time is determined by a display mode of a display system, which is coupled to the memory bus 222 (FIG. 2). If a display speed is 30 frames/second or 60 1920×540 field pictures per second, one picture time for a frame picture would be 1/30 second, and one picture time for a field picture would be 1/60 second. For the highest resolution mode, 1080i, each frame including 1920×1080 pixels, the required real time macroblock decode rate would be:

$$30\left(\frac{\text{frames}}{\text{second}}\right) \times \frac{1920 \times 1080\left(\frac{\text{pixels}}{\text{frame}}\right)}{16 \times 16\left(\frac{\text{pixels}}{\text{macroblock}}\right)} = 243{,}000\left(\frac{\text{macroblocks}}{\text{second}}\right) \quad (1)$$

The decoding system 200 (FIG. 2) must be able to decode a worst-case picture in the highest resolution display mode in one picture time. A worst-case reference data fetch bandwidth (regardless of display mode) occurs for a frame picture consisting entirely of B-coded field-predicted macroblocks and/or P-coded dual prime-predicted macroblocks. Alternatively, a worst-case reference data fetch bandwidth may occur for a field picture consisting entirely of B-coded 16×8 predicted macroblocks. The required bandwidth is the same for any of these worst case scenarios. Further, when half pixel averaging is used, the reference data required for the reconstruction of each macroblock are four 17×9 pixel chunks from four difference places in one frame space (if the macroblock is P-coded), or from two difference places in each of two frame spaces (if the macroblock is B-coded).

Figure 6:
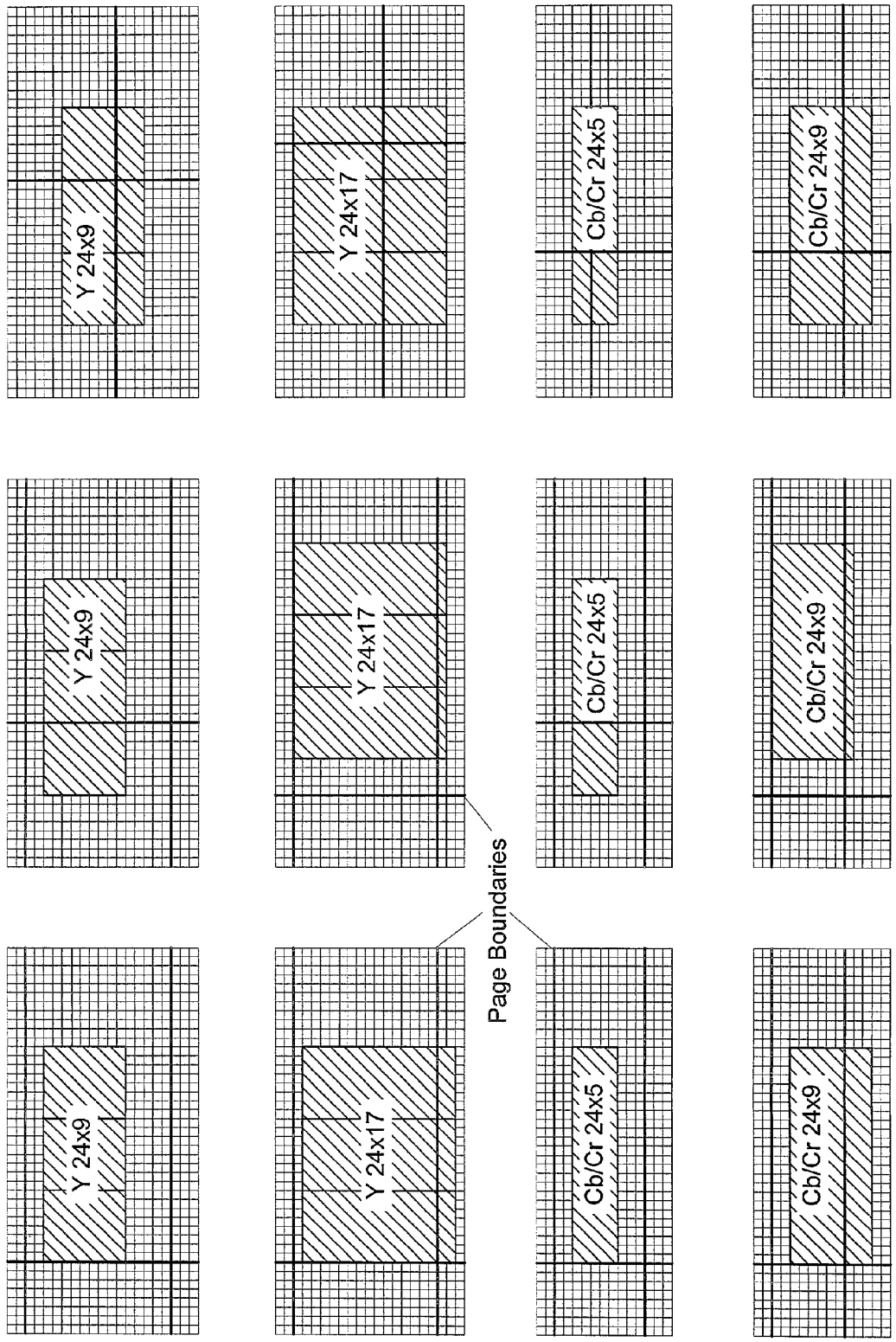
FIG. 6 is a diagram illustrating luminance and chrominance blocks overlapping memory pages.

As discussed above, fetching each of the 17×9 pixel chunks requires fetching one 9-rows of 24-byte luminance chunk and one 5-rows of 24-byte chrominance chunk. The 9-rows of 24 byte luminance chunk may come from a 24×9 luminance block or from every other row of a 24×17 luminance block (if field prediction mode is used) in a reference frame. Further, the 5-rows of 24 byte chrominance chunk may come from a 24×5 interleave chrominance block or from every other row of a 24×9 interleaved chrominance block (if field prediction mode is used) in a reference frame. When the macroblock tiling format as recited above is used to store the reference frame in the memory 220 (FIG. 2), the 24×9 or 24×17 luminance block may fall across (i.e., overlap) 1, 2 or 4 memory pages, while the 24×5 or 24×9 interleaved chrominance block may fall across 1, 2 or 4 memory pages as shown in FIG. 6. Ignoring memory packet restrictions, the worst-case bandwidth requirement is therefore:

$$243{,}000\left(\frac{MB}{\text{sec}}\right) \times \left(\frac{\text{pixel.chunks}}{MB}\right) \times (9 \times 3 + 5 \times 3)\left(\frac{\text{words}}{\text{pixel} \cdot \text{chunks}}\right) = \quad (2)$$

$$40.8 \times 10^6 \left(\frac{\text{words}}{\text{sec}}\right)$$

Figure 7:
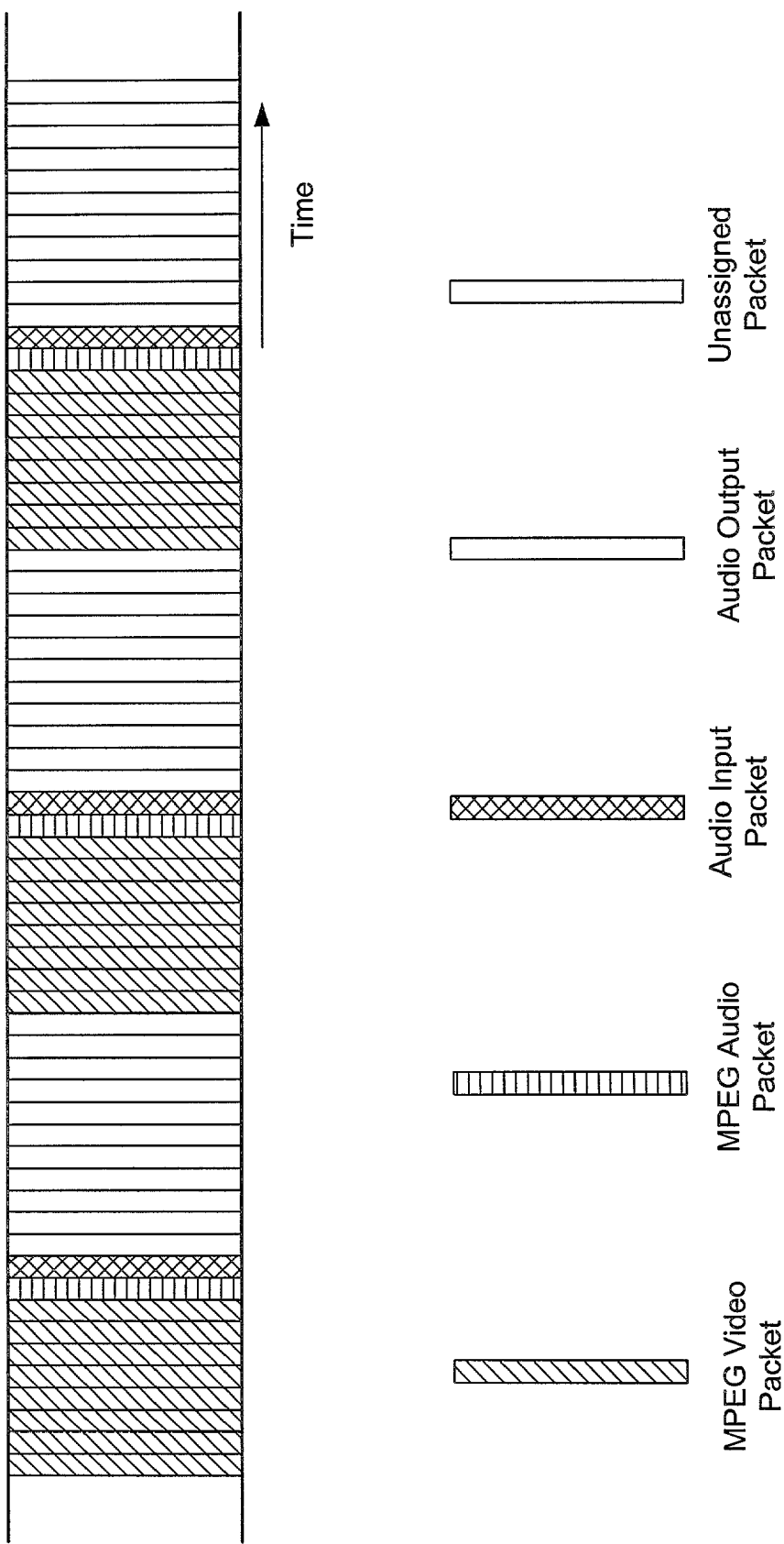
FIG. 7 is a diagram illustrating time-domain multiplexing of a memory bus.

As shown in FIG. 2, pixel data are read from and written into the memory 220 through the memory bus 222, which is shared by the MPEG coprocessor 202 and other peripherals 218, and the memory interface unit 224. In one embodiment, data is transferred over the memory bus 222 in data packets with each data packet including 16 words of data. When time-domain multiplexing is used, time on the memory bus 222 is broken up into time slices long enough to send at least one data packet. A predetermined number of time slices may be allocated to each peripheral 218 for transferring data packets to and/or from the peripheral 218. FIG. 7 is a diagram showing time on the memory bus 222 (FIG. 2) broken up into time slices for transferring MPEG video packets associated with the MPEG co-processor 202 (FIG. 2), and time slices for transferring MPEG audio packets, audio input packets and audio output packets associated with the other peripherals 218. The unassigned packets in FIG. 7 may be used by non-real time units (e.g., a microprocessor).

If pixel data is transferred from the memory 220 in one-page data packets, meaning that each data packet includes data from a single memory page, considering that each 9-rows of 24-byte luminance chunk or 5-rows of 24-byte chrominance chunk may fall across up to four pages, there may be up to $$8\left(\frac{\text{packets}}{\text{pixel} \cdot \text{chunk}}\right) \times 4\left(\frac{\text{pixel} \cdot \text{chunk}}{MB}\right) = 32\left(\frac{\text{packets}}{MB}\right) \quad (3)$$

required for the reconstruction of one macroblock. The result is a worst case bandwidth of $$243{,}000\left(\frac{MB}{\text{sec}}\right) \times 32\left(\frac{\text{packets}}{MB}\right) = 7.78 \times 10^6 \left(\frac{\text{packets}}{\text{sec}}\right), \text{or} \quad (4)$$

$$7.78 \times 10^6 \left(\frac{\text{packets}}{\text{sec}}\right) \times 16\left(\frac{\text{words}}{\text{packets}}\right) = 124 \times 10^6 \left(\frac{\text{words}}{\text{second}}\right) \quad (5)$$

This bandwidth is much greater than the worst case bandwidth without any packet restrictions.

Because a predetermined number of time slices are allocated to the MPEG coprocessor 202, a predetermined bandwidth is guaranteed for the MPEG coprocessor 202. The decoding system 200 (FIG. 2) needs to use this predetermined bandwidth in an efficient manner so that a worst case picture may be decoded in one picture time. A solution employing a packet switched memory bus but more efficient in terms of required packets per second, is to combine multiple variable-sized references from different memory pages into a single data packet (multi-page data packet). In one exemplary embodiment, the solution is achieved by allowing the 16 words in one packet to come from two memory pages. In an alternative embodiment, the 16 words in one packet may come from three memory pages.

Figure 8A:
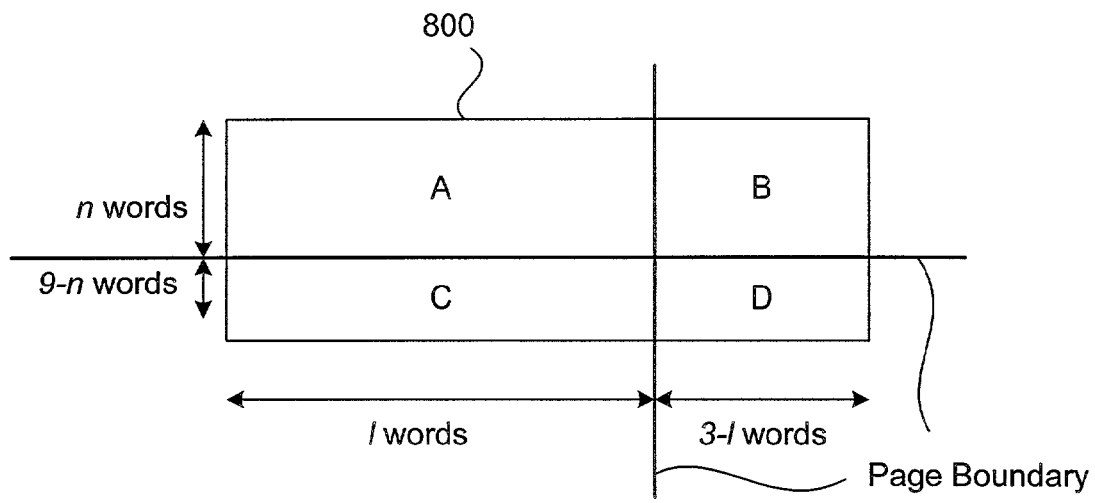
FIG. 8A is a diagram showing a 17×9 luminance chunk falling across four memory pages.

FIG. 8A illustrates how a 9×24 byte luminance chunk 800 may fall across 1, 2 or 4 memory pages A-D. The luminance chunk 800 is typically split into one, two or all four of these memory pages in a manner in which page A holds n rows of l data words in the luminance chunk, page B holds n rows of 3-l data words in the luminance chunk, page C holds 9-n rows of l data words in the luminance chunk and page D holds 9-n rows of 3-l data words in the luminance chunk, where n=0, 1, 2, . . . , 9 and l=0, 1, 2 or 3. Depending on the prediction mode and on the specific manner in which luminance data samples in each macroblock are mapped to the work positions in a corresponding memory page in the memory 220 (FIG. 2), the data words to be fetched from each page may or may not be in contiguous word positions.

Figure 8B:
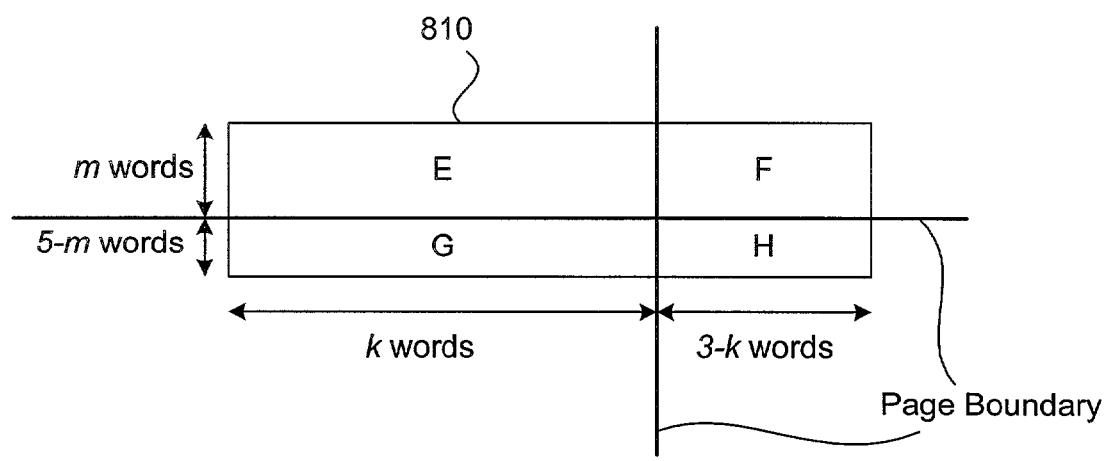
FIG. 8B is a diagram showing a 18×5 chrominance chunk falling across four memory pages.

FIG. 8B illustrates how a 24×5 chrominance chunk 810 may fall across 1, 2 or 4 memory pages E-H. The chrominance chunk 810 is typically split into some or all of these memory pages in a manner in which page E holds m rows of k data words in the luminance chunk, page F holds m rows of 3-k data word in the luminance chunk, page G holds 5-m rows of k data words in the luminance chunk and page H holds 5-m rows of 3-k data words in the luminance chunk, where m=0, 1, 2, . . . , 5 and k=0, 1, 2 or 3. As with the embodiment of FIG. 8A, depending on the prediction mode and on the specific manner in which chrominance data samples in each macroblock are mapped to the word positions in a corresponding memory page in the memory 220 (FIG. 2), the data words to be fetched from each page may or may not be in contiguous word positions.

Figure 8C:
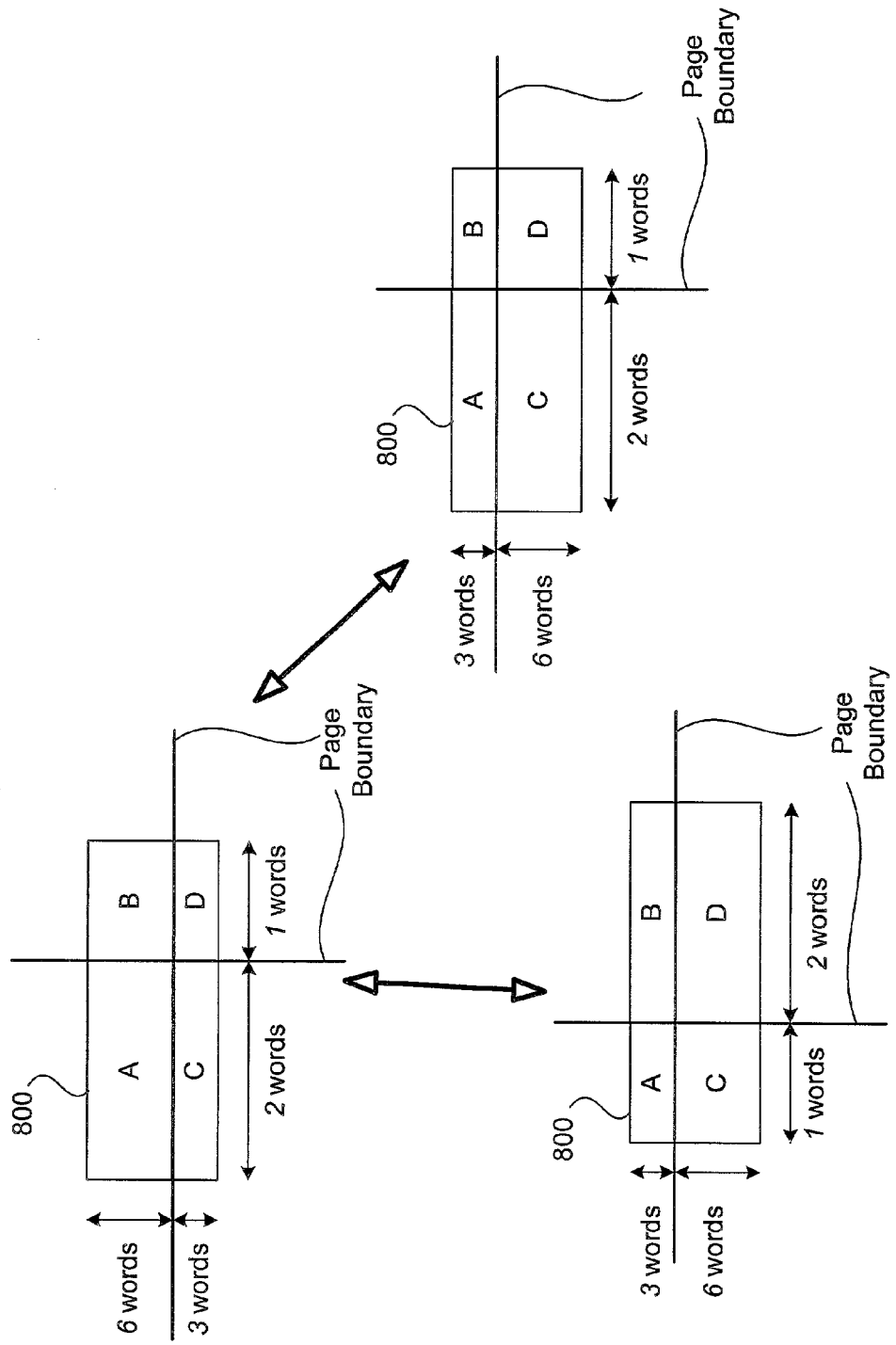
FIG. 8C is a diagram illustrating symmetry among different configurations of a luminance chunk.
Figure 8D:
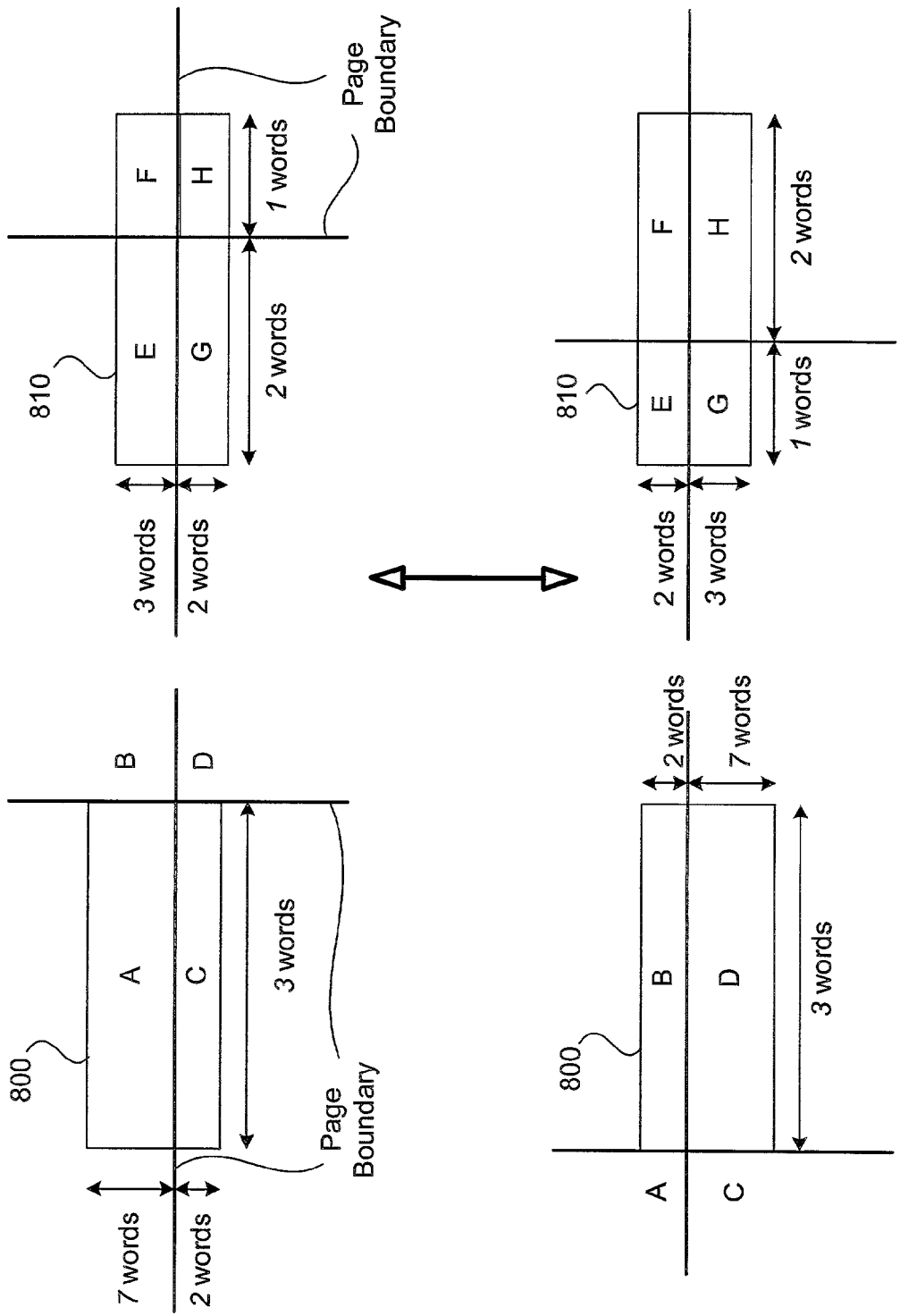
FIG. 8D is a diagram illustrating symmetry between two different configurations of a luminance chunk and a chrominance chunk.

There are therefore 10×4×6×4=960 possible cases corresponding to the combination of luminance and chrominance configurations represented by the combinations of the values of m, n, k and l. However, symmetry allows the reduction of the number of cases that need to be considered for packetization. For example, as shown in FIG. 8C, cases with n=6 and l=2 are symmetric to cases corresponding to n=9−6=3 and l=2 or l(3−2) if k and m are the same, and these cases are equivalent for purposes of packetization. In another example shown in FIG. 8D, a case corresponding to n=7, l=3, m=3 and k=2 is symmetric to a case corresponding to n=2, l=0, m=2 and k=1, and these cases are equivalent for purposes of packetization.

Figure 8E:
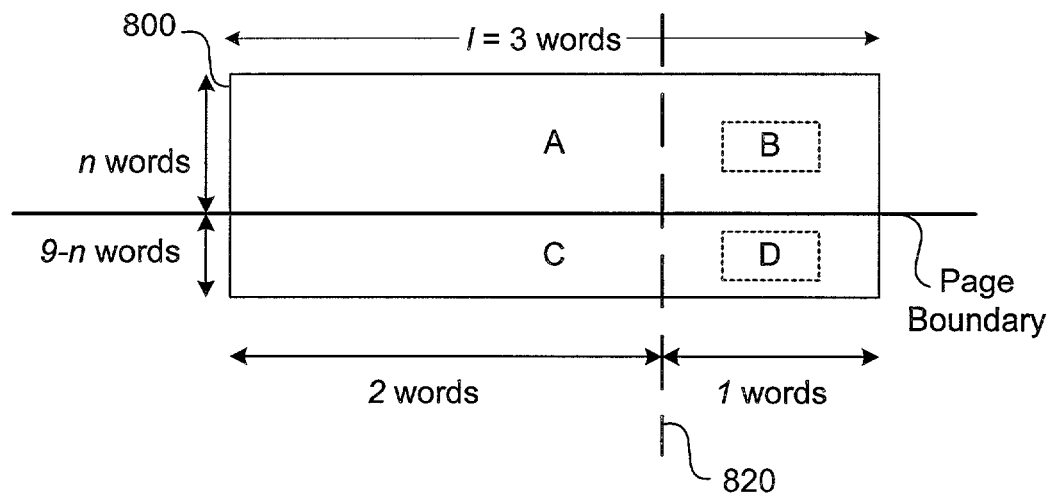
FIG. 8E is a diagram illustrating a 17×9 luminance chunk falling across two memory pages being treated as falling across four memory pages.

In an exemplary embodiment, a case with l=3 is packetized in the same manner as a case with l=2, if m, n and k remain the same. For a case with l=3 (FIG. 8E), when a luminance chunk is split across pages A and C only, a virtual page boundary 820 is placed to split the left two words of each row from the right 1 word of the row in the luminance chunk. Therefore, the luminance chunk is still considered as falling across four pages A-D, as in the case when l=2. However, in the present case, pages B and D are actually part of pages A and C, respectively.

Figure 8F:
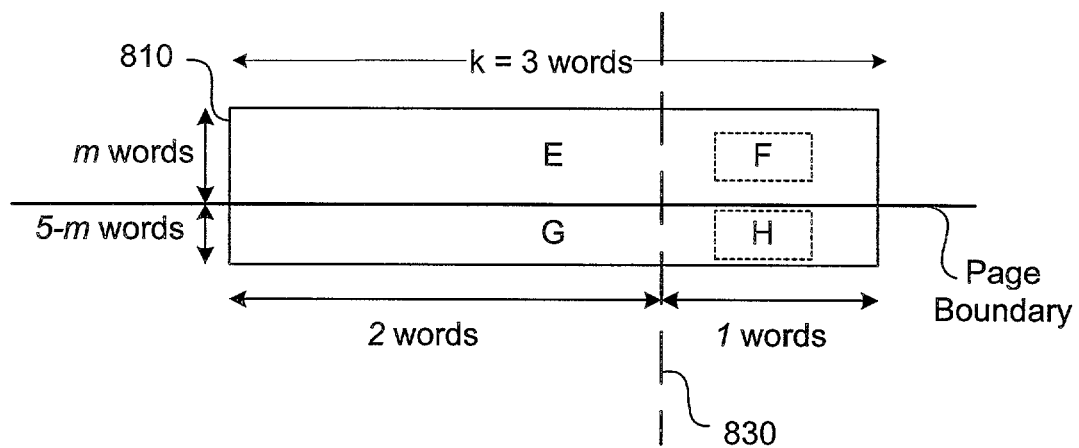
FIG. 8F is a diagram illustrating a 18×5 chrominance chunk falling across two memory pages being treated as falling across four memory pages.

Similarly, a case with k=3 is also packetized in the same manner as a case with k=2, if m, n and k remain the same. As shown in FIG. 8F for a case with k=3 when a chrominance chunk is split across pages E and G only, a virtual page boundary 830 is placed to split the left 2 words of each row from the right 1 word of the row in the chrominance chunk. Therefore, the chrominance chunk is still considered as falling across four pages E-H, as in the case when k=2. However, in the present case, pages F and H are actually part of pages E and G, respectively. Therefore, for purposes of packetization, only the variations of n=5, 6, 7, 8, 9 and m=3, 4, 5 regardless of the values of k and l, are considered relevant. Moreover, the number of cases to be considered for planning a packetization scheme is further reduced to 5×3=15. Referring back to FIG. 2, this process is intended to simplify the logic in the address generator 212 in the MPEG coprocessor 202 that generates memory read commands and in the reference data assembly module 214 that reassembles pixel data from data packets 236 transferred from the memory 220.

Figure 8G:
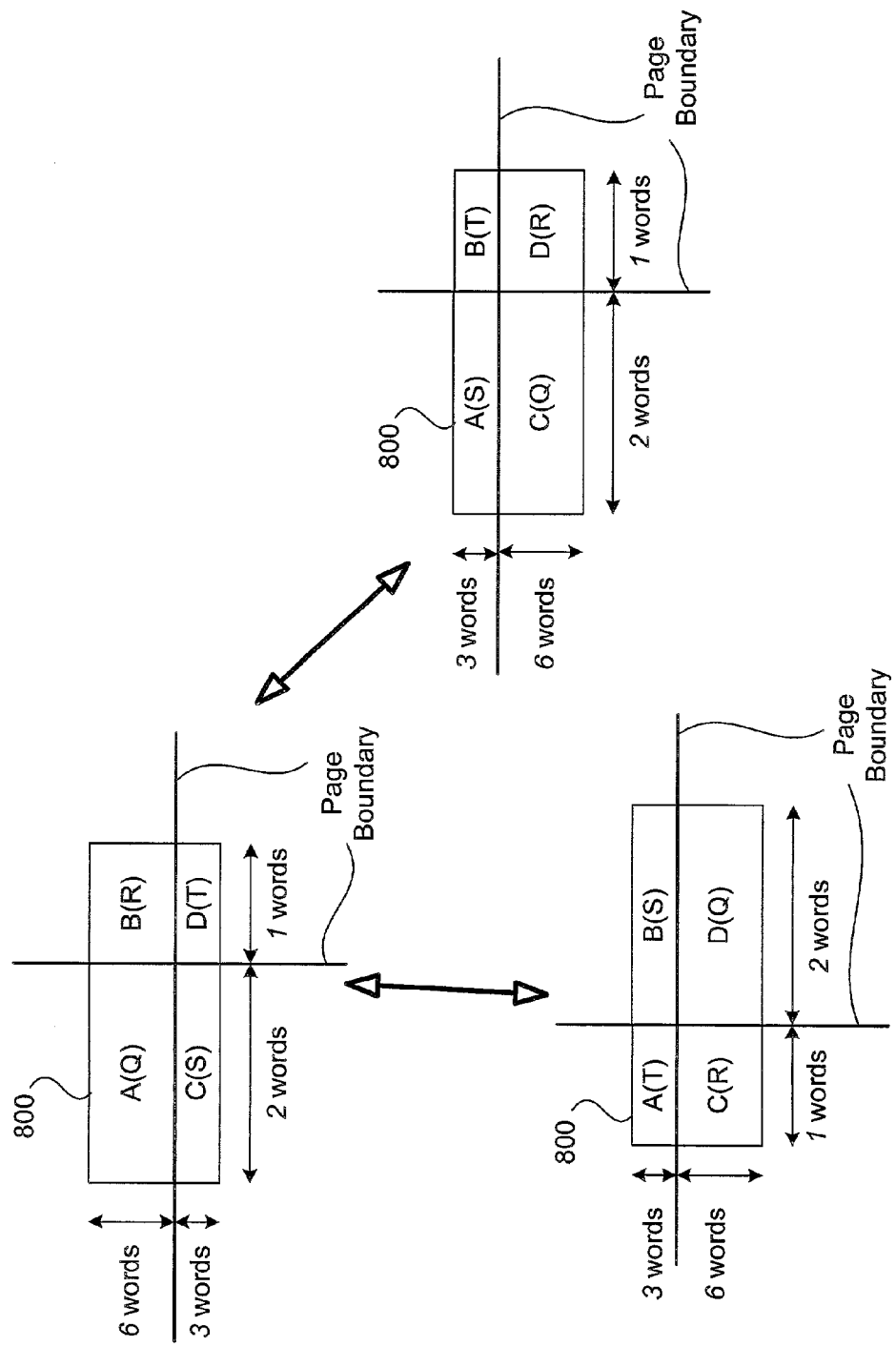
FIG. 8G is a diagram showing that any of pages A, B, C and D could be page Q, R, S or T.
Figure 8H:
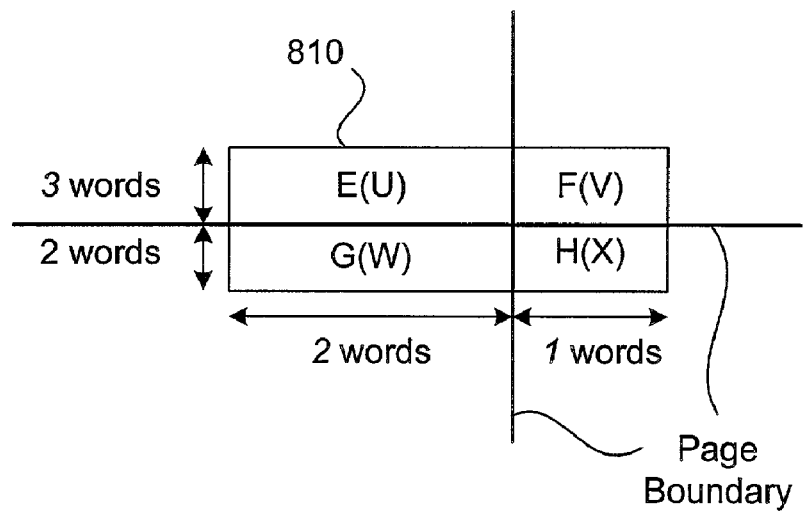
FIG. 8H is a diagram showing that any of pages E, F, G and H could be page U, V, W or X.
Figure 8H:
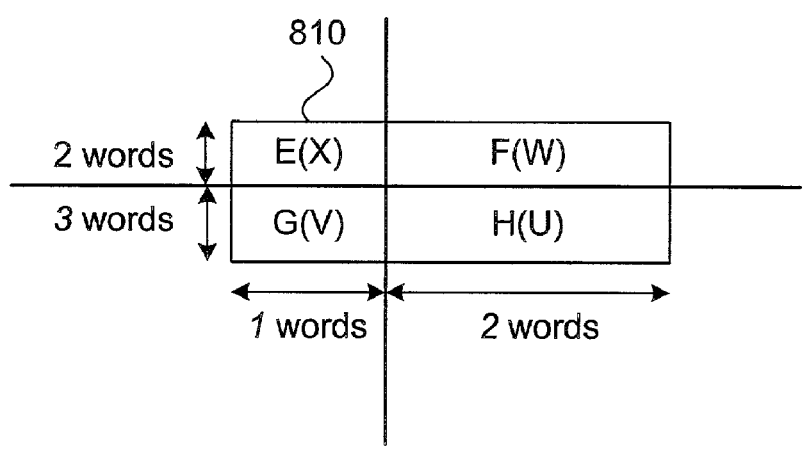

Referring to FIG. 8G, the luminance chunk 800 may be considered as falling across four memory pages (i.e., pages Q, R, S and T). Page Q includes more than four rows of two words of luminance data, while page R includes more than four rows of 1 word of luminance data. Further, page S includes up to three rows of 2 words of luminance data and page T includes up to three rows of 1 word of luminance data. Similarly as seen in FIG. 8H, the chrominance chunk 810 may be considered as falling across four memory pages (i.e., pages U, V, W and X). Page U includes more than two rows of 2 words of chrominance data and page V includes more than two rows of 1 word of chrominance data. Additionally, page W includes up to two rows of 2 words of luminance data, while page X includes up to two rows of 1 word of luminance data. As shown in FIGS. 8G and 8H, any of the pages Q, R, S and T may be pages A, B, C or D, and any of the page U, V, W and X may be page E, F, G or H, depending on specific configurations as represented by the combinations of the values of n, l, m and k.

In one exemplary embodiment in which two-page packets are used (i.e., each data packet is allowed to include data from up to two memory pages) in most of the 15 cases, a 17×9 luminance chunk and a 18×5 chrominance chunk may be fitted into up to four data packets as shown in Table 1 below. Table 1 is included in an address generator 212 logic in the MPEG coprocessor 202 for generating memory requests to fetch reference pixel data. As shown, Table 1 includes a list of 15 combinations of luminance and chrominance configurations and a packetization scheme to fit a 17×9 luminance chunk and a 18×5 chrominance chunk into up to four data packets for each of the 15 combinations.

TABLE 1

Packetization Scheme for Two-Page Packets

| n | m | Words in packet #1* | Words in packet #2 | Words in packet #3 | Words in packet #4 | Words in packet #5 |
|---|---|---|---|---|---|---|
| 9 | 5 | 16(Q) | 2(Q) + 9(R) | 10(U) + 5(V) | | |
| 9 | 4 | 16(Q) | 2(Q) + 9(R) | 8(U) + 4(V) | 2(W) + 1(X) | |
| 9 | 3 | 16(Q) | 2(Q) + 9(R) | 6(U) + 3(V) | 4(W) + X(V) | |
| 8 | 5 | 16(Q) | 8(R) + 2(S) | 1(T) + 10(U) | 5(V) | |
| 8 | 4 | 16(Q) | 8(R) + 2(S) | 1(T) + 8(U) | 4(V) + 2(W) | 1(X) |
| 8 | 3 | 16(Q) | 8(R) + 2(S) | 1(T) + 6(U) | 3(V) + 4(W) | 2(X) |
| 7 | 5 | 14(Q) + 2(T) | 7(R) + 4(S) | 10(U) + 5(V) | | |
| 7 | 4 | 14(Q) + 2(T) | 7(R) + 4(S) | 8(U) + 4(V) | 2(W) + 1(X) | |
| 7 | 3 | 14(Q) + 2(T) | 7(R) + 4(S) | 6(U) + 3(V) | 4(W) + 2(X) | |
| 6 | 5 | 12(Q) + 3(T) | 6(R) + 6(S) | 10(U) + 5(V) | | |
| 6 | 4 | 12(Q) + 3(T) | 6(R) + 6(S) | 8(U) + 4(V) | 2(W) + 1(X) | |
| 6 | 3 | 12(Q) + 3(T) | 6(R) + 6(S) | 6(U) + 3(V) | 4(W) + 2(X) | |
| 5 | 5 | 10(Q) + 5(T) | 8(R) + 4(S) | 10(U) + 5(V) | | |
| 5 | 4 | 10(Q) + 5(T) | 8(R) + 4(S) | 8(U) + 4(V) | 2(W) + 1(X) | |
| 5 | 3 | 10(Q) + 5(T) | 8(R) + 4(S) | 6(U) + 3(V) | 4(W) + 2(X) | |

Thus in Table 1, "2(Q)+9(R)" means 2 words from page Q and 9 words from page R.

In a couple of worst split cases, five packets are needed to include all of the data samples from the luminance and chrominance chunks. Note that Table 1 only shows one way of packetizing a pair of luminance and chrominance chunks, and those skilled in the art will recognize that there are many alternative ways of arranging the pixel data from the pair of luminance and chrominance chunks into up to five two-page packets for each of the 15 cases. Compared with the worst case in the prior art where each data packet may only include data from a single memory page and eight packets are always needed to include data in a pair of luminance and chrominance chunks each falling across four memory pages, the improvement in bandwidth requirement is significant. The resulting worst case bandwidth is now:

$$243{,}000\left(\frac{MB}{\sec}\right) \times 20\left(\frac{\text{packets}}{MB}\right) = 4.86 \times 10^6\left(\frac{\text{packets}}{\sec}\right), \text{ or} \tag{6}$$

$$4.86 \times 10^6\left(\frac{\text{packets}}{\sec}\right) \times 16\left(\frac{\text{words}}{\text{packets}}\right) = 77.8 \times 10^6\left(\frac{\text{words}}{\text{second}}\right) \tag{7}$$

In an alternative embodiment in which three-page packets are used (i.e. each data packet is allowed to include data from up to three memory pages) further improvement can be made. In most of the 15 cases, a 17×9 luminance chunk and a 18×5 chrominance chunk are fitted into up to three data packets as shown in Table 2 below. Table 2 is a list of 15 combinations of luminance and chrominance configurations and a packetization scheme to fit a 17×9 luminance chunk and a 18×5 chrominance chunk into up to three data packets for each of the 15 combinations.

TABLE 2

Packetization Scheme for Three-Page Packets

| n | m | Words in packet #1 | Words in packet #2 | Words in packet #3 | Words in packet #4 |
|---|---|---|---|---|---|
| 9 | 5 | 16(Q) | 2(Q) + 9(R) | 10(U) + 5(V) | |
| 9 | 4 | 16(Q) | 2(Q) + 9(R) + 4(V) | 8(U) + 2(W) + 1(X) | |
| 9 | 3 | 16(Q) | 2(Q) + 9(R) + 3(V) | 6(U) + 4(W) + 2(X) | |
| 8 | 5 | 16(Q) | 8(R) + 2(S) + 1(T) | 10(U) + 5(V) | |
| 8 | 4 | 16(Q) | 8(R) + 2(S) + 1(T) | 8(U) + 4(V) + 2(W) | 1(X) |
| 8 | 3 | 16(Q) | 8(R) + 2(S) + 1(T) | 6(U) + 3(V) + 4(W) | 2(X) |
| 7 | 5 | 14(Q) + 2(T) | 7(R) + 4(S) | 10(U) + 5(V) | |
| 7 | 4 | 14(Q) + 2(T) | 7(R) + 4(S) + 2(W) | 8(U) + 4(V) + 1(X) | |
| 7 | 3 | 14(Q) + 2(T) | 7(R) + 4(S) + 4(W) | 6(U) + 3(V) + 2(X) | |
| 6 | 5 | 12(Q) + 3(T) | 6(R) + 6(S) | 10(U) + 5(V) | |
| 6 | 4 | 12(Q) + 3(T) | 6(R) + 6(S) + 4(V) | 8(U) + 2(W) + 1(X) | |
| 6 | 3 | 12(Q) + 3(T) | 6(R) + 6(S) + 3(V) | 6(U) + 4(W) + 2(X) | |
| 5 | 5 | 10(Q) + 5(T) | 8(R) + 4(S) | 10(U) + 5(V) | |
| 5 | 4 | 10(Q) + 5(T) | 8(R) + 4(S) + 4(V) | 8(U) + 2(W) + 1(X) | |
| 5 | 3 | 10(Q) + 5(T) | 8(R) + 4(S) + 3(V) | 6(U) + 4(W) + 2(X) | |

In several of the worst split cases, four packets are needed to include all of the data samples from the luminance and chrominance chunks. Note that Table 2 only shows one way of packetizing a pair of luminance and chrominance chunks, and those skilled in the art will recognize many alternative ways of arranging pixel data from a pair of luminance and chrominance chunks into up to four three-page packets for each of the 15 cases. The resulting worst case bandwidth is now:

$$243{,}000\left(\frac{MB}{\sec}\right) \times 16\left(\frac{\text{packets}}{MB}\right) = 3.89 \times 10^6\left(\frac{\text{packets}}{\sec}\right), \text{ or} \tag{8}$$

$$3.89 \times 10^6\left(\frac{\text{packets}}{\sec}\right) \times 16\left(\frac{\text{words}}{\text{packets}}\right) = 62.2 \times 10^6\left(\frac{\text{words}}{\sec}\right). \tag{9}$$

This is half of the worst case bandwidth when one-page packets are used. It is possible to treat a 17×17 block as a 17×9 block (i.e., every other row of a 17×17 block) plus a 17×8 block (i.e., every other row of a 17×15 block), each of which can use the same packetizing process described above. These blocks will never cross more than four pages, even if pages only hold 16 rows of pixels. However, this method is not optimally efficient since the 17×8 block is using a packet format designed for a 17×9 block, but it will meet the worst-case requirements because only two reference blocks are required in this mode (as opposed to the four reference blocks required in the application text mode). It should be noted that if a page contains 32 rows, a 17×33 block will never fall across more than four pages.

Figure 9:
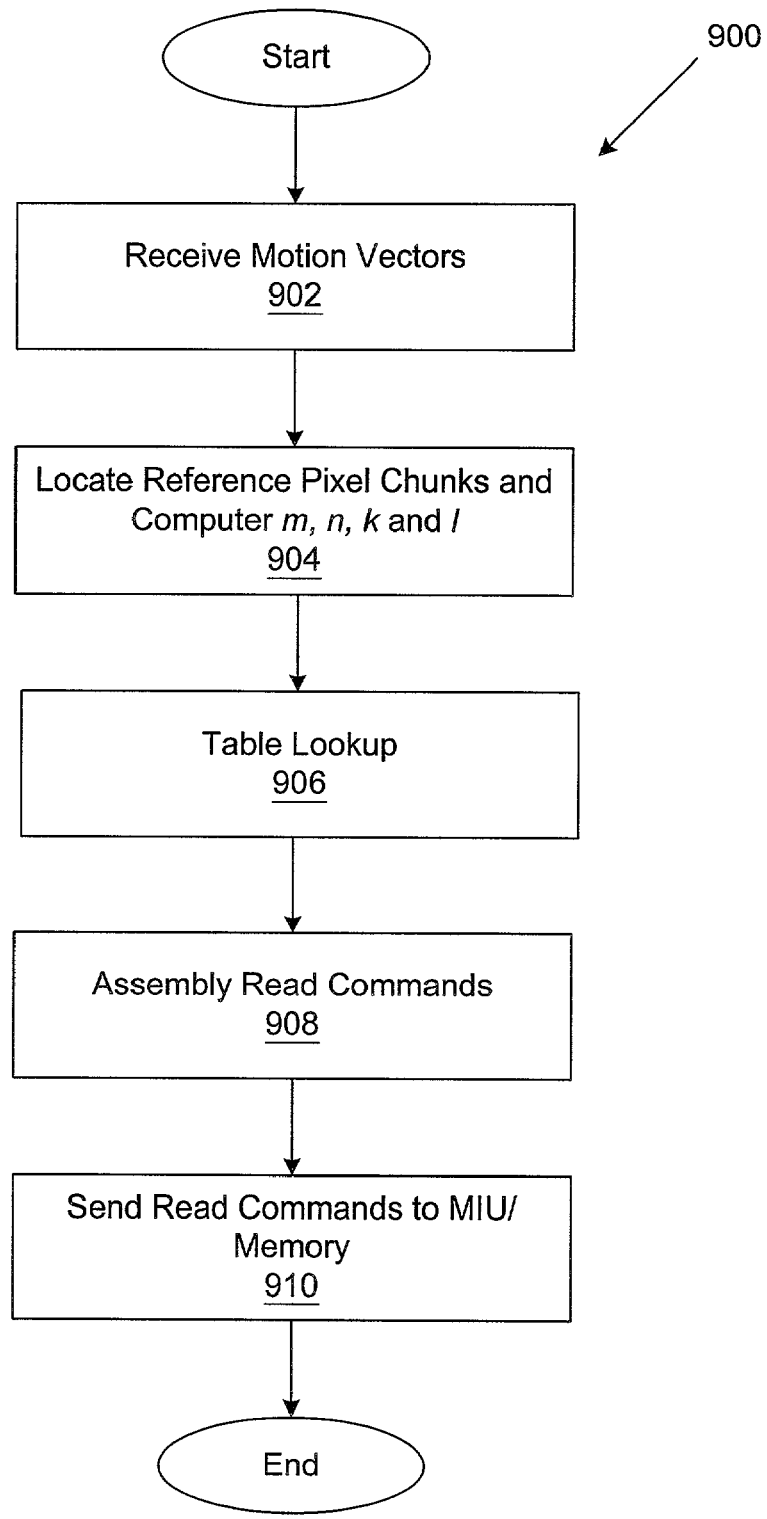
FIG. 9 is a flowchart illustrating logic in an address generating module for requesting reference pixel data to be sent in multi-page data packets.

FIG. 9 is a flowchart 900 of a memory request generating process used by the address generator 212 (FIG. 2). In step 902, motion vectors pointing to the reference pixel chunks and other relevant parameters such as the picture type, the macroblock type and the motion prediction mode associated with the macroblock to the reconstructed from the VLD module 208 (FIG. 2) in the MPEG coprocessor 202 (FIG. 2) are received. In one embodiment, the address generator 212 may determine if the present case is a worst case. By using the table-driven address generator 212 and packet assembly logic, potential savings in bandwidth is possible.

In step 904, the address generator 212 proceeds with locating the reference pixel chunks and, for each reference pixel chunk, calculates the values of m, n, l, and k based on the received parameters and the macroblock tiling format used to store reference pictures in memory 220 (FIG. 2). For each reference pixel chunk, once the values of m, n, l and k are determined, pages Q, R, S, T and U, V, W, X can be assigned to appropriate memory pages based on the values of m, n, l and k. Next, Table 1 or Table 2 are looked up in step 906, and a packetization scheme is chosen for the specific configuration represented by the values of m, n, l and k.

The address generator 212 then assembles read commands 232 (FIG. 2) in step 908 for each pixel chunk based on the chosen packetization scheme. If there is more than one reference pixel chunk, the read commands 232 corresponding to the pixel chunks are sent in a predetermined order. The required pixel chunks and the predetermined order are specific to the picture type and the motion prediction mode of the macroblock under reconstruction. A read command 232 may include instructions such as putting specific words from specific pages into a data packet. In step 910, the read commands 232 are sent to the memory interface unit 224 (FIG. 2) through the memory bus 222 (FIG. 2). Subsequently, the motion vectors 234 (FIG. 2) pointing to the reference pixel chunks and other relevant parameters such as the picture type, the macroblock type and the motion prediction mode associated with the macroblock to be reconstructed are passed to the reference data assembly module 214 (FIG. 2) in the MPEG coprocessor 202.

Figure 10:
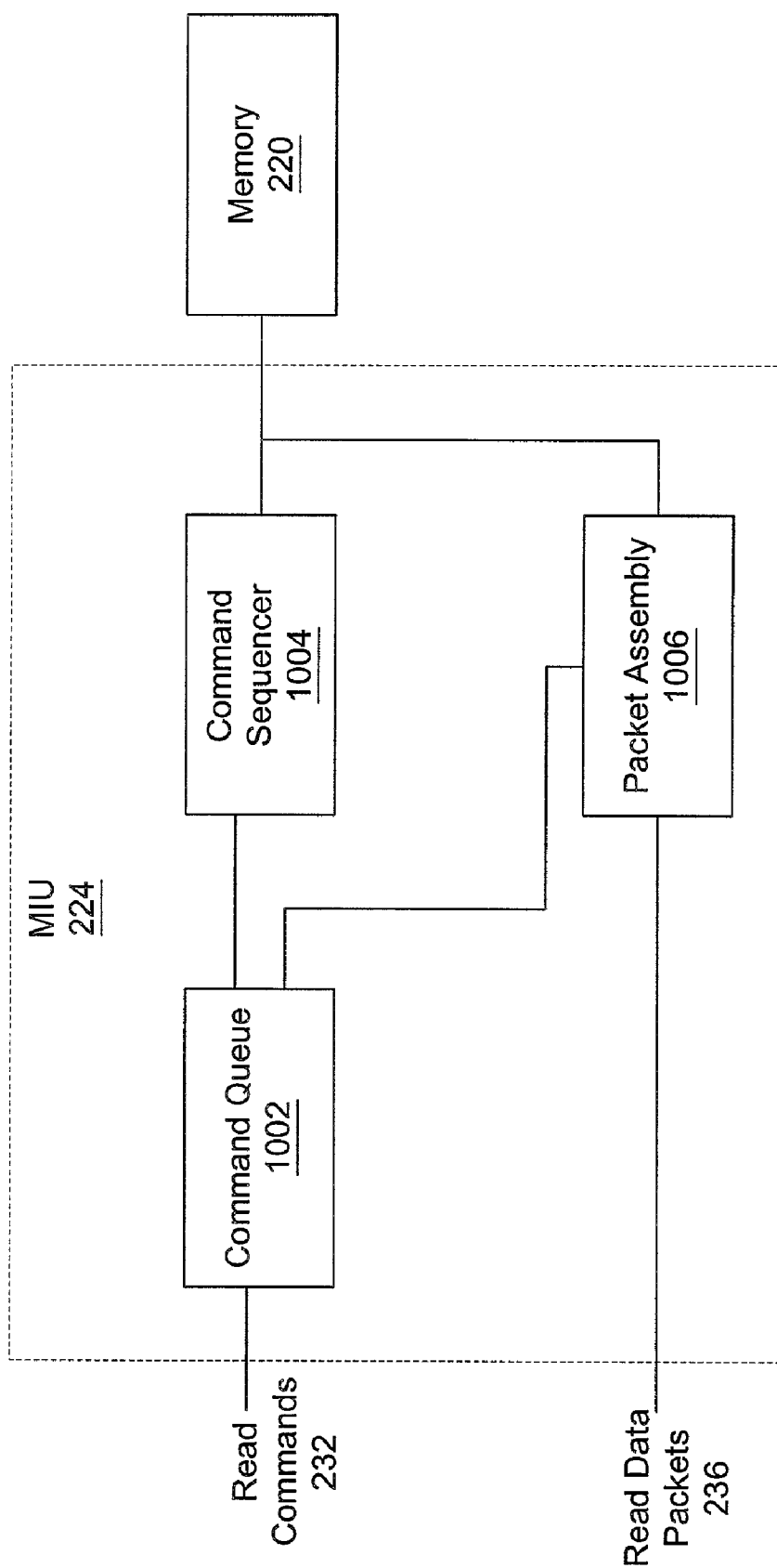
FIG. 10 is a block diagram illustrating some of functional units of a memory interface unit for packetizing reference pixel data into multi-page data packets.

FIG. 10 illustrates functional units in the memory interface unit 224 (FIG. 2) including a command queue 1002, a command sequencer 1004 and a packet assembly unit 1006 for forming read data packets 236. The read commands 232 from the address generator 212 (FIG. 2) are queued in the command queue 1002, and sequenced by the command sequencer 1004. The command sequencer 1004 sends instructions to the memory 220 to request that pixel data corresponding to each reference pixel chunk be sent to the packet assembly unit 1006. SDRAM chips have an interface protocol which requires the memory interface unit 224 to send a sequence of commands to read (or write) a single word of data. The command sequencer 1004 is responsible for generating these sequences of commands for each read, and for retrieving the data as it comes back from the SDRAM chips a few cycles later. Additionally, multiple pages (one in each bank) can be kept open across multiple read/write commands for optimization. This includes keeping track of which pages are open at any given time and ordering read/write commands to minimize opening of new pages. The packet assembly unit 1006 assembles read data packets based on the read commands 232 from the command queue, and sends the read data packets 236 to the reference data assembly module 214 (FIG. 2) in the MPEG coprocessor 202 (FIG. 2) through the memory bus 222 (FIG. 2).

Figure 11:
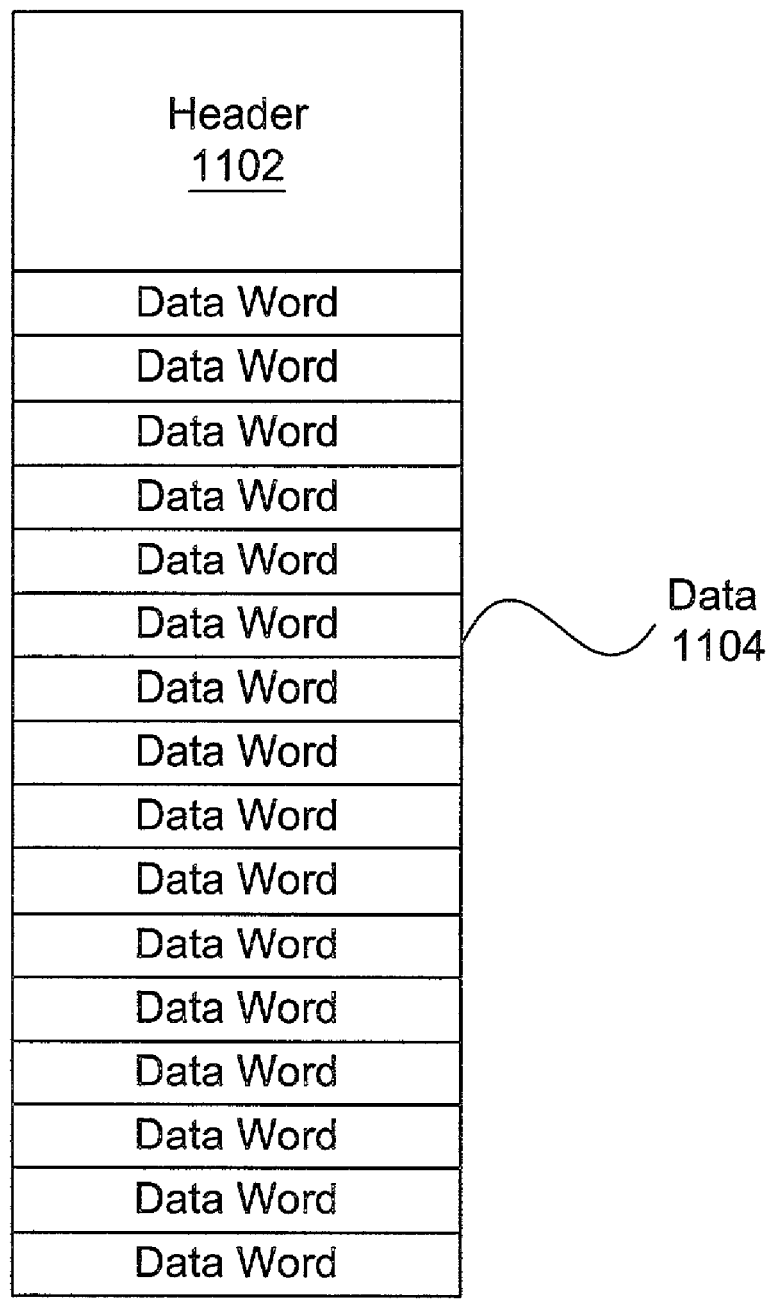
FIG. 11 is a block diagram illustrating a structure of a data packet.

Each data packet, as shown in FIG. 11, includes a header 1102 and 16 words of data 1104, although some of the 16 words 1104 may not be used. Bus protocol is simpler by having 16 words in each data packet, especially for time slicing. Although it would be possible to acquire a bit more bandwidth by compressing out unused data words, the tradeoff in complexity would make it unfeasible. The header 1102 may include information such as to which pixel chunk the data in the packet belongs. The header 1102 must contain enough information for the recipient (i.e., reference data assembly module 214) to be able to figure out which command this data is associated with. The easiest method would be to have the memory interface unit 224 (FIG. 2) process commands (or at least send back responses) in the same order in which they were received. In this case, since the reference data assembly module 214 knows exactly which commands were sent out and in which order, the response headers need only contain destination to distinguish from packets destined for other modules.

Functional units in the reference data assembly module 214 (FIG. 2) including five data packet buffers, an assembly data path module, a luminance buffer and a chrominance buffer. For each reference pixel chunk, up to five read data packets corresponding to the reference pixel chunk may be received by the reference data assembly module 214, and each data packet is buffered in a packet buffer. The assembly path module, which has received the motion vectors and other relevant parameters associated with the macroblock to be reconstructed: (1) calculates the values of m, n, l and k for each reference pixel chunk; (2) determines the predetermined order in which the data packets corresponding to the reference pixel chunks will be received; (3) determines the packetization scheme used to pack the data packets by table lookup (e.g., Table 1 or Table 2); and (4) reassembles the pixel data in the up to five data packets into a luminance chunk and a chrominance chunk. The pixel data in the reassembled luminance and chrominance chunks are buffered in the luminance buffer and the chrominance buffer, respectively.

The invention has been described above with reference to specific embodiments. It will be apparent to those skilled in the art that various modifications may be made and other embodiments can be used without departing from the broader scope of the invention. Therefore, these and other variations upon the specific embodiments are intended to be covered by the present invention.

What is claimed is:

1. A method for generating memory requests to fetch read data from a plurality of locations in a memory, the memory comprising a plurality of memory pages, each of the memory pages having a plurality of words, the method comprising the steps of:

determining the locations of the read data in the memory;

selecting a packetization scheme based on the locations of the read data;

assembling at least one read command for addressing the plurality of locations of the read data; and fetching the read data from the memory locations and combining it into a plurality of data packets in accordance with the selected packetization scheme, wherein at least one data packet contains data from more than one of the plurality of memory pages.

2. The method of claim 1 further comprising the step of sending the at least one read command corresponding to the plurality of data packets to the memory.

3. The method of claim 2 further comprising the step of fetching the read data in response to sending the at least one read command.

4. The method of claim 1 wherein the read data comprises a reference pixel chunk having a luminance chunk and a chrominance chunk.

5. The method of claim 4 wherein the step of determining the location of the read data further comprises receiving at least a set of motion vectors pointing to the reference pixel chunk.

6. The method of claim 5 further comprising the step of determining a first set of components associated with the reference pixel chunk based on the at least a set of motion vectors.

7. The method of claim 4 wherein the step of selecting a packetization scheme further comprises combining a part of the luminance chunk and a part of the chrominance chunk into one of the plurality of data packets to be sent from the memory when the luminance chunk overlaps more than one of the plurality of memory pages.

8. The method of claim 4 wherein the step of selecting a packetization scheme further comprises combining a first part of the luminance chunk and a second part of the luminance chunk into one of the plurality of data packets to be sent from the memory when the luminance chunk overlaps more than one of the plurality of memory pages.

9. The method of claim 4 wherein the step of selecting a packetization scheme further comprises combining a first part of the chrominance chunk and a second part of the chrominance chunk into one of the plurality of data packets to be sent from the memory when the chrominance chunk overlaps more than one of the plurality of memory pages.

10. The method of claim 4 further comprising the step of placing a virtual memory page boundary across the luminance chunk, the virtual memory page boundary being associated with the packetization scheme.

11. The method of claim 4 further comprising the step of placing a virtual memory page boundary across the chrominance chunk, the virtual memory page boundary being associated with the packetization scheme.

12. The method of claim 1 wherein the packetization scheme selected maps a first set of components to a second set of components by a table lookup.

13. The method of claim 12 wherein the first set of components comprises the read data corresponding to the luminance chunk and the chrominance chunk, and the second set of components comprises the selected ones of the plurality of words.

14. The method of claim 1 wherein each of the at least one read command includes specifications for combining selected ones of the plurality of words from selected ones of the plurality of memory pages into the plurality of data packets.

15. The method of claim 1 wherein the plurality of data packets is equal to or less than a predetermined number.

16. The method of claim 15 wherein the predetermined number is four and the selected ones of the plurality of memory pages is two.

17. The method of claim 15 wherein the predetermined number is four and the selected ones of the plurality of memory pages is three.

18. The method of claim 1 wherein the plurality of data packets comprise 16 words.

19. A method for packing read data into data packets, the read data being stored in a plurality of locations in a memory, the memory comprising a plurality of memory pages, the method comprising the steps of:
receiving at least one read command requesting the read data, the at least one read command comprising specifications for including in the data packets a plurality of selected portions of the read data from the plurality of memory pages;
sending instructions to the memory according to the at least one read command received, the instructions relating to a manner in which the read data requested is to be obtained from the memory;
receiving the read data from the memory in response to the memory receiving the instructions; and
packing the read data received into the data packets according to the specifications of each of the at least one read commands, wherein at least one data packet contains data from more than one of the plurality of memory pages.

20. The method of claim 19 wherein the read data is a reference pixel chunk comprising a luminance chunk and a chrominance chunk.

21. A method for reassembling reference pixel data from a plurality of data packets into a luminance chunk and a chrominance chunk, comprising the steps of:
receiving the plurality of data packets, each data packet comprising a portion of a reference pixel chunk including the luminance chunk and the chrominance chunk;
determining a packetization scheme used to packetize the luminance and chrominance chunks into the plurality of data packets based upon the locations in memory of the data; and
unpacking the plurality of data packets into a reassembled luminance chunk and a reassembled chrominance chunk based on the packetization scheme.

22. The method of claim 21 further comprising the steps of forming prediction blocks by arranging the plurality of data packets unpacked with any information related to motion vectors, and combining blocks with associated macroblocks to form a reconstructed macroblock.

23. The method of claim 22 further comprising the step of writing the reconstructed macroblock to a memory having a plurality of memory pages;
selecting a packetization scheme based on a location of read data and on fitting the read data into the plurality of data packets; and
assembling at least one read command for fetching the read data from the memory in accordance with the packetization scheme selected, wherein at least one data packet contains data from more than one of the plurality of memory pages.

24. A computer readable storage medium having embodied thereon a program, the program being executable by a computer processor to perform a method for generating memory requests to fetch read data from a plurality of locations in a memory, the method comprising:
determining the locations of the read data in the memory;
selecting a packetization scheme based on the location of the read data;
assembling at least one read command for addressing the plurality of locations of the read data; and
fetching the read data from the memory locations and combining it into a plurality of data packets in accordance with the selected packetization scheme, wherein at least one data packet contains data from more than one of the plurality of memory pages.

25. A computer readable storage medium having embodied thereon a program, the program being executable by a computer processor to perform a method for packing read data into data packets, the method comprising:
receiving at least one read command requesting the read data, the at least one read command comprising specifications for including in the data packets plurality of selected portions of the read data from a plurality of memory pages;
sending instructions to the memory according to the at least one read command received, the instructions relating to a manner in which the read data requested is to be obtained from the memory;
receiving the read data from the memory in response to a memory receiving the instructions; and
packing the read data received into the data packets according to the specifications of each read command, wherein at least one data packet contains data from more than one of the plurality of memory pages.

26. A system for generating memory requests to fetch read data from a plurality of locations in a memory, comprising:
means for determining the locations of the read data in the memory;
means for selecting a packetization scheme based on the locations of the read data and;
means for assembling at least one read command for addressing the plurality of locations of the read data; and
means for fetching the read data from the memory locations and combining it into a plurality of data packets in accordance with the selected packetization scheme, wherein at least one data packet contains data from more than one of the plurality of memory pages.

27. A system for packing read data into data packets, comprising:
means for receiving at least one read command requesting the read data, the read command comprising specifications for including in the data packets selected portions of the read data from a plurality of memory pages;

means for sending instructions to a memory according to the read command received, the instructions relating to a manner in which the read data requested is to be obtained from the memory;

means for receiving the read data, from the memory in response to the memory receiving the instructions; and means for packing the read data received into the data packets according to the specifications of each read command, wherein at least one data packet contains data from a plurality of memory pages.

28. A system for decoding pictures in a compressed video bit stream, comprising:

a memory having a plurality of memory pages storing reference pixel data;

an address generator coupled to the memory for generating memory commands for fetching the reference pixel data from the memory;

means for packing the fetched reference pixel data into a plurality of data packets according to the specifications of the memory commands;

a reference data assembly module coupled to the address generator for receiving from the memory the plurality of data packets; and means for unpacking the plurality of data packets and reassembling the fetched reference pixel data into a reassembled video bit stream, wherein at least one data packet contains data from more than one of the plurality of memory pages.

29. The system of claim 28 wherein the reference pixel data comprises a luminance chunk and a chrominance chunk.

30. The system of claim 28 wherein the memory commands comprises specifications for combining selected portions of the reference pixel data from a selected one or more of the plurality of memory pages into at least one of the plurality of data packets.

31. The system of claim 28 wherein the reference data assembly module unpacks the plurality of data packets to transform the reference pixel data into a reassembled luminance chunk and a reassembled chrominance chunk.

32. The system of claim 28 wherein the reference data assembly module comprises a plurality of data buffers, each data buffer being configured to receive one of the plurality of data packets.

33. The system of claim 28 wherein the reference data assembly module comprises an additional module for reassembling the reference pixel data based on a set of motion vectors, a table lookup and packetization scheme used to form the plurality of data packets.

34. The system of claim 28 wherein the reference data assembly module comprises a plurality of data buffers for buffering a reassembled luminance chunk and a reassembled chrominance chunk.

35. The system of claim 28 further comprising a variable length decoding module configured to extract a set of motion vectors corresponding to a macroblock in the compressed video bit stream.

36. The system of claim 35 wherein the variable length decoding module sends the extracted set of motion vectors to the address generator.

37. The system of claim 28 further comprising a memory interface unit coupled to the memory.

38. The system of claim 37 wherein the memory interface unit further comprises a memory queue for storing the generated memory commands from the address generator.

39. The system of claim 38 wherein at least one of the plurality of data packets includes the reference pixel data from at least two of the plurality of memory pages based on the generated memory commands in the memory queue.

40. The system of claim 37 wherein the memory interface unit further comprises a sequencer for forwarding the generated memory commands to the memory to obtain the reference pixel data based on specifications.

41. The system of claim 37 wherein the memory interface unit further comprises a packet assembly unit for assembling the plurality of data packets of the reference pixel data obtained from the memory.

* * * * *